United States Patent
Lee et al.

(10) Patent No.: US 12,254,238 B2
(45) Date of Patent: Mar. 18, 2025

(54) ELECTRONIC DEVICE INCLUDING VIBRATION DEVICE AND METHOD FOR OPERATING THE SAME

(71) Applicant: SAMSUNG ELECTRONICS CO., LTD., Suwon-si (KR)

(72) Inventors: Wookwang Lee, Suwon-si (KR); Jaejin Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 231 days.

(21) Appl. No.: 17/957,491

(22) Filed: Sep. 30, 2022

(65) Prior Publication Data

US 2023/0168856 A1 Jun. 1, 2023

Related U.S. Application Data

(63) Continuation of application No. PCT/KR2022/013173, filed on Sep. 2, 2022.

(30) Foreign Application Priority Data

Nov. 26, 2021 (KR) .................. 10-2021-0165594
Dec. 7, 2021 (KR) .................. 10-2021-0173894

(51) Int. Cl.
*G06F 3/16* (2006.01)
*G06F 3/01* (2006.01)
(Continued)

(52) U.S. Cl.
CPC .............. *G06F 3/16* (2013.01); *G06F 3/016* (2013.01); *G06F 13/20* (2013.01); *H04R 3/00* (2013.01)

(58) Field of Classification Search
CPC . G06F 3/162; G06F 3/165; G06F 3/16; G06F 3/016; G06F 13/20; H04R 3/00
See application file for complete search history.

(56) References Cited

U.S. PATENT DOCUMENTS 9,002,034 B2 4/2015 Sollenberger et al.
10,852,831 B2 12/2020 Kang et al.
(Continued)

FOREIGN PATENT DOCUMENTS

JP 2017189368 A 10/2017
JP 2019067269 A 4/2019
(Continued)

OTHER PUBLICATIONS

International Search Report and Written Opinion for International Application No. PCT/KR2022/013173; International Filing Date Sep. 2, 2022; Date of Mailing Dec. 16, 2022; 9 Pages.

*Primary Examiner* — Joseph Saunders, Jr.
(74) *Attorney, Agent, or Firm* — CANTOR COLBURN LLP

(57) ABSTRACT

According to various embodiments, there may be provided an electronic device comprising a vibration device, a vibration device integrated circuit (IC) connected to the vibration device, a first bus, a second bus, and at least one processor electrically connected to the vibration device IC through each of the first bus and the second bus; wherein the at least one processor is configured to transfer first data to the vibration device IC through the first bus, transfer second data to the vibration device IC through the second bus different from the first bus, and control the vibration device IC to drive the vibration device based on data selected from the first data and the second data. Other various embodiments are possible as well.

20 Claims, 17 Drawing Sheets

(51) Int. Cl.
*G06F 13/20* (2006.01)
*H04R 3/00* (2006.01)

(56) References Cited

U.S. PATENT DOCUMENTS

| | | |
|---|---|---|
| 2011/0204830 A1 | 8/2011 | Kim et al. |
| 2012/0137163 A1* | 5/2012 | Sasagawa ........... G06F 11/2043 |
| | | 714/E11.132 |
| 2012/0319951 A1 | 12/2012 | Lee |
| 2013/0073295 A1 | 3/2013 | Johnson |
| 2016/0034133 A1 | 2/2016 | Wilson et al. |
| 2016/0300559 A1 | 10/2016 | Lee et al. |
| 2017/0300022 A1 | 10/2017 | Yamashita et al. |
| 2019/0005782 A1 | 1/2019 | Bhatia et al. |
| 2019/0121520 A1 | 4/2019 | Cieplinski et al. |
| 2020/0286343 A1 | 9/2020 | Moussette et al. |

FOREIGN PATENT DOCUMENTS

| | | |
|---|---|---|
| KR | 100902354 B1 | 6/2009 |
| KR | 100986619 B1 | 10/2010 |
| KR | 20120126446 A | 11/2012 |
| KR | 20150116241 A | 10/2015 |
| KR | 20200017719 A | 2/2020 |

* cited by examiner

ELECTRONIC DEVICE INCLUDING VIBRATION DEVICE AND METHOD FOR OPERATING THE SAME

CROSS-REFERENCE TO RELATED APPLICATION(S)

This application is a continuation of International Application No. PCT/KR2022/013173 designating the United States, filed on Sep. 2, 2022, in the Korean Intellectual Property Receiving Office and claiming priority to Korean Patent Application No. 10-2021-0165594, filed on Nov. 26, 2021, in the Korean Intellectual Property Office, and to Korean Patent Application No. 10-2021-0173894, filed on Dec. 7, 2021, in the Korean Intellectual Property Office, the disclosures of all of which are incorporated by reference herein in their entireties

TECHNICAL FIELD

Various embodiments of the disclosure relate to an electronic device including a vibration device and a method for operating the same.

BACKGROUND ART

With the recent rapid development of electronic devices, electronic devices capable of wireless voice calls and information exchange have become must-have items. In the early stage of widespread use of electronic devices, electronic devices were recognized as things capable of simply wireless calls. However, as technology evolves, and wireless Internet is adopted, electronic devices have a diversity of applications, such as playing game, remote controlling on short-range communication, and image shooting on the equipped digital camera, as well as for mere telephony or scheduling.

In particular, the electronic device provides content for stimulating various types of senses, meeting the user's desire. In particular, since content to stimulate the tactile sense along with the content to stimulate the visual and auditory senses may be provided, more information may be transferred to the user by the electronic device. Haptic sensing, for example, relates to any sense of touch and is a combination of a tactile sense, which is the detection of force on the skin surface, and kinesthetic sense, which relates to a sensing of body movement and muscle strength. The tactile sense is a fundamental human sense and becomes more meaningful.

Therefore, a technology for realizing content for stimulating the tactile sense in various ways is currently required.

DISCLOSURE

Technical Problem

Electronic devices drive the motor included in the vibration device (or vibration generator), thereby providing the user with the vibration, generated by the weight rotated by the rotation of the motor, as tactile content. For example, the processor may transfer data (e.g., index) to a vibration device integrated circuit (IC) for driving the vibration device through a specific communication interface (e.g., an inter integrated circuit (I2C) bus) and control the vibration device IC to generate vibrations of characteristics corresponding to the obtained data. In this case, since there is a limit to the type of data that may be transferred through the specific communication interface (e.g., I2C bus), the scheme for generating vibrations by the electronic device may be limited. Accordingly, restrictions may arise in the design and/or implementation of the electronic device. Further, even when the processor transfers various types of data for generating vibrations to the vibration device IC, there is no reference on what data the vibration device IC should be based to generate vibrations. Therefore, in an environment in which various types of data are transferred to the vibration device IC, an error occurs when the operation of generating vibration is performed, thereby increasing the operational burden of the electronic device.

Technical Solution

According to various embodiments, there may be provided an electronic device comprising a vibration device, a vibration device integrated circuit (IC) connected to the vibration device, a first bus, a second bus, and at least one processor electrically connected to the vibration device IC through each of the first bus and the second bus; wherein the at least one processor is configured to transfer first data to the vibration device IC through the first bus, transfer second data to the vibration device IC through the second bus different from the first bus, and control the vibration device IC to drive the vibration device based on data selected from the first data and the second data.

According to various embodiments, there may be provided a method for operating an electronic device, comprising transferring first data to a vibration device IC of the electronic device through a first bus of the electronic device, transferring second data to the vibration device IC through a second bus of the electronic device, different from the first bus, and controlling the vibration device IC to drive the vibration device based on data selected from the first data and the second data.

According to various embodiments, there may be provided an electronic device comprising a vibration device, a vibration device IC connected to the vibration device, an inter integrated circuit (I2C) bus, an integrated interchip sound (I2S) bus, and at least one processor electrically connected to the vibration device IC through each of the I2C bus and the I2S bus, wherein the at least one processor is configured to transfer first data to the vibration device IC through the I2C bus, and transfer second data to the vibration device IC through the I2S bus, and wherein the second data includes pulse code modulation (PCM) data.

As described herein various embodiments provide an electronic device and a method includes, which utilizes a processor and a vibration device IC connected via different data buses configured to operate according to different protocols, respectively. In one or more non-limiting embodiments, the processor and the vibration device IC are connected I2S bus configured to operate according to the I2S protocol, as well as an I2C bus configured to operate according to the I2C protocol which is different from the I2S protocol. Accordingly, vibrations can be generated in various manners based on the data (e.g., audio data) transmitted through the I2S bus as well as the data transmitted through the I2C bus. Thus, the design and/or implementation examples of the electronic device may be expanded. According to various embodiments, the electronic device and the operation method controls to provide vibration based on specific data among a plurality of data when the plurality of data are provided to the vibration device IC through a plurality of interfaces (e.g., an I2C bus and an I2S bus), thereby preventing an error in performing the operation of generating vibration.

Embodiments of the disclosure are not limited to the foregoing objectives, and other objectives would readily be appreciated by a skilled artisan from the following detailed description taken in conjunction with the accompanying drawings.

Advantageous Effects

According to various embodiments, there may be provided an electronic device and the operation method that includes a processor and a vibration device IC connected via an I2S bus as well as the I2C and is thus allowed to generate vibration in various manners based on the data (e.g., audio data) transmitted through the I2S bus as well as the data transmitted through the I2C bus, thereby expanding the design and/or implementation examples of the electronic device.

According to various embodiments, there may be provided an electronic device and operation method that controls to provide vibration based on specific data among a plurality of data when the plurality of data are provided to the vibration device IC through a plurality of interfaces (e.g., I2C bus and I2S bus), thereby preventing an error in performing the operation of generating vibration.

MODE FOR INVENTION

Figure 1:
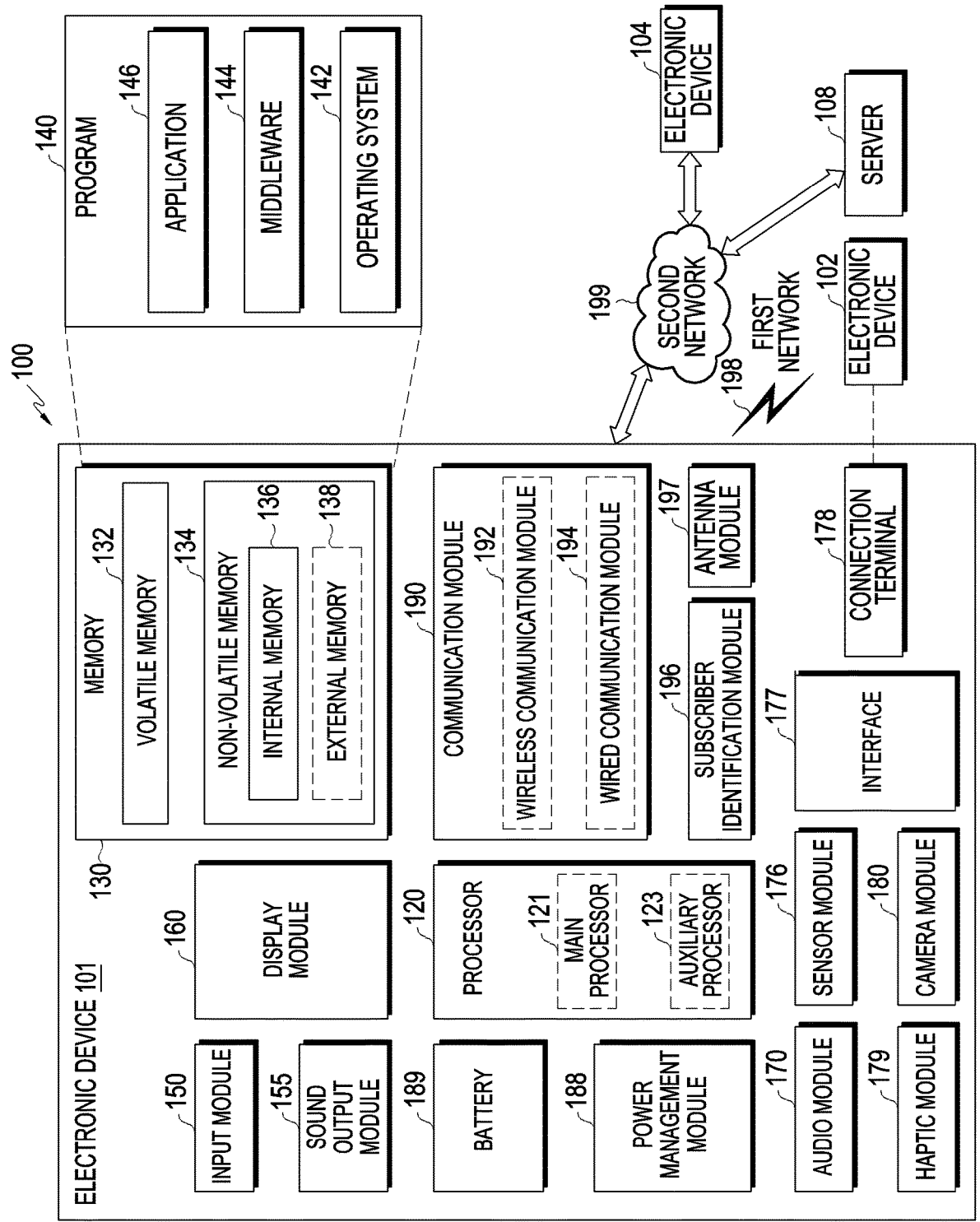
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, an electronic device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an example of an operation of an electronic device 200 (e.g., the electronic device 101 of FIG. 1) according to various embodiments is described with reference to FIG. 2.

Figure 2:
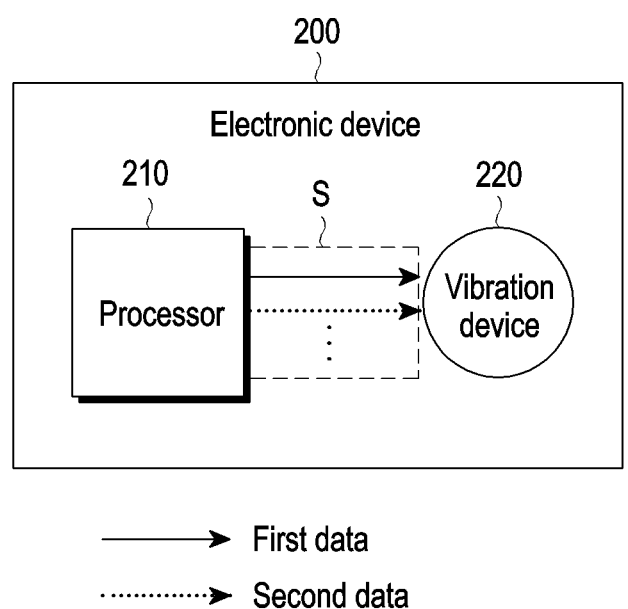
FIG. 2 is a view illustrating an example of an operation of providing vibration using a vibration device based on a plurality of data of an electronic device according to various embodiments.

FIG. 2 is a view illustrating an example of an operation of providing vibration using a vibration device 220 based on a plurality of data of an electronic device 200 (e.g., a processor 210) according to various embodiments.

According to various embodiments, the electronic device 200 (e.g., the processor 210) may obtain a plurality of data (e.g., first data and second data) for providing vibration to the user as shown in FIG. 2. For example, the plurality of data (e.g., first data and second data) are data used to generate vibration in the vibration device 220 IC for driving the vibration device 220, and may be defined as a haptic source (S). For example, the haptic source (S) may include various types of data signals and, as described below, may include data of a type that may be transmitted through an I2C bus and/or an integrated interchip sound (I2S) bus. For example, the haptic source (S) may include index data to be described below, transferred through an I2C bus. The index data may include an index (or value) for indicating a vibration of a specific characteristic (e.g., a specific pattern or a specific magnitude). As is described below, information for generating a vibration of a specific characteristic (e.g., magnitude and/or pattern) for each of a plurality of values that may be included in the index data may be previously stored in a vibration device IC (e.g., the vibration device IC 330 of FIG. 3). Accordingly, the vibration of the specific characteristic corresponding to the value included in the index data may be generated in the vibration device IC. As another example, the haptic source (S) may include A2H data and/or ACH data to be described below, transferred through an I2S bus. The A2H data and/or the ACH data may include, for example, audio data (e.g., PCM data). Meanwhile, the data received through the I2C bus and the data received through the I2S bus are not limited to the described examples, but may further include various types of data signals for driving the vibration device 220. For example, the data of the type transmittable through the I2S bus may further include other types of data, e.g., image data, which may be obtained based on other types of content, such as image data, than the audio data (e.g., PCM data).

According to various embodiments, when a plurality of haptic sources (S) are obtained, the electronic device 200 (e.g., processor 210) may select specific data for generating vibration from among the plurality of haptic sources (S), and this is described below.

Hereinafter, examples of a configuration of the electronic device 200 according to various embodiments are described.

Figure 3:
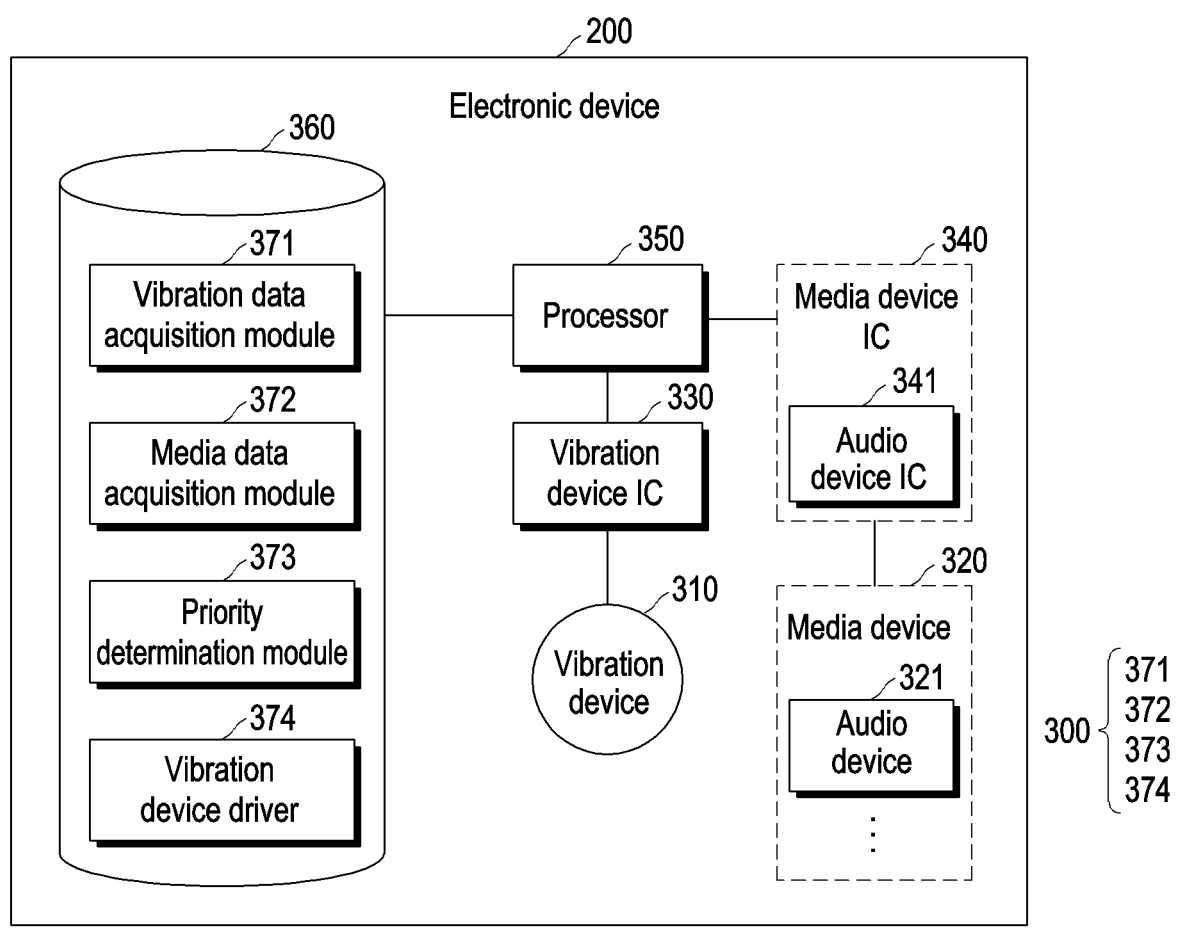
FIG. 3 is a view illustrating an example of a configuration of an electronic device according to various embodiments.

FIG. 3 is a view illustrating an example of a configuration of an electronic device 200 according to various embodiments. FIG. 3 is described below with reference to FIGS. 4A, 4B, 5, and 6.

Figure 4A:
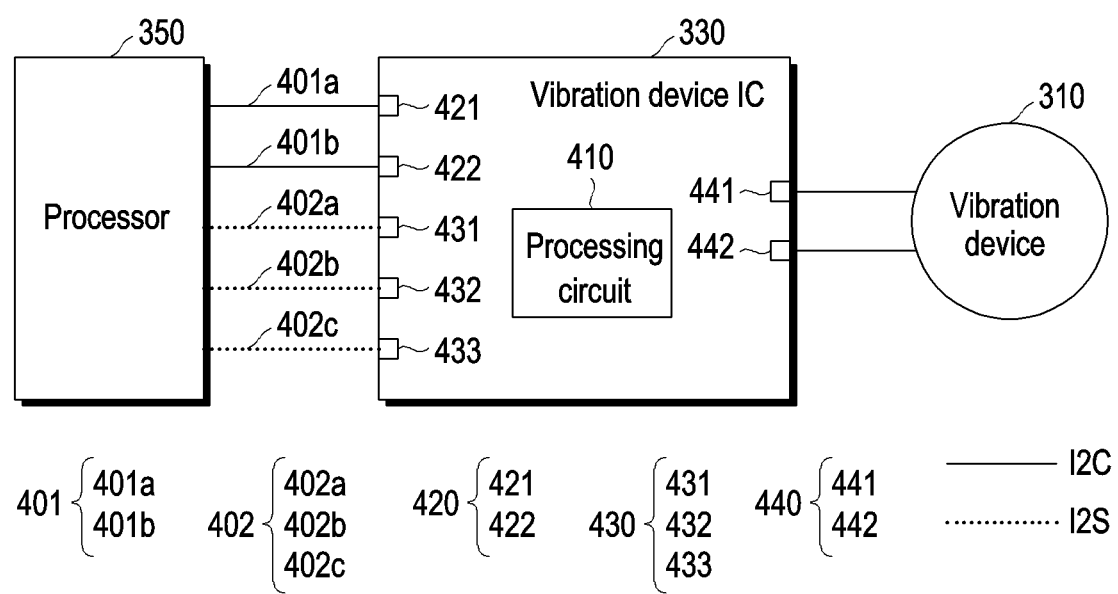
FIG. 4A is a view illustrating an example of a processor and a vibration device IC connected via different types of communication interfaces according to various embodiments.
Figure 4B:
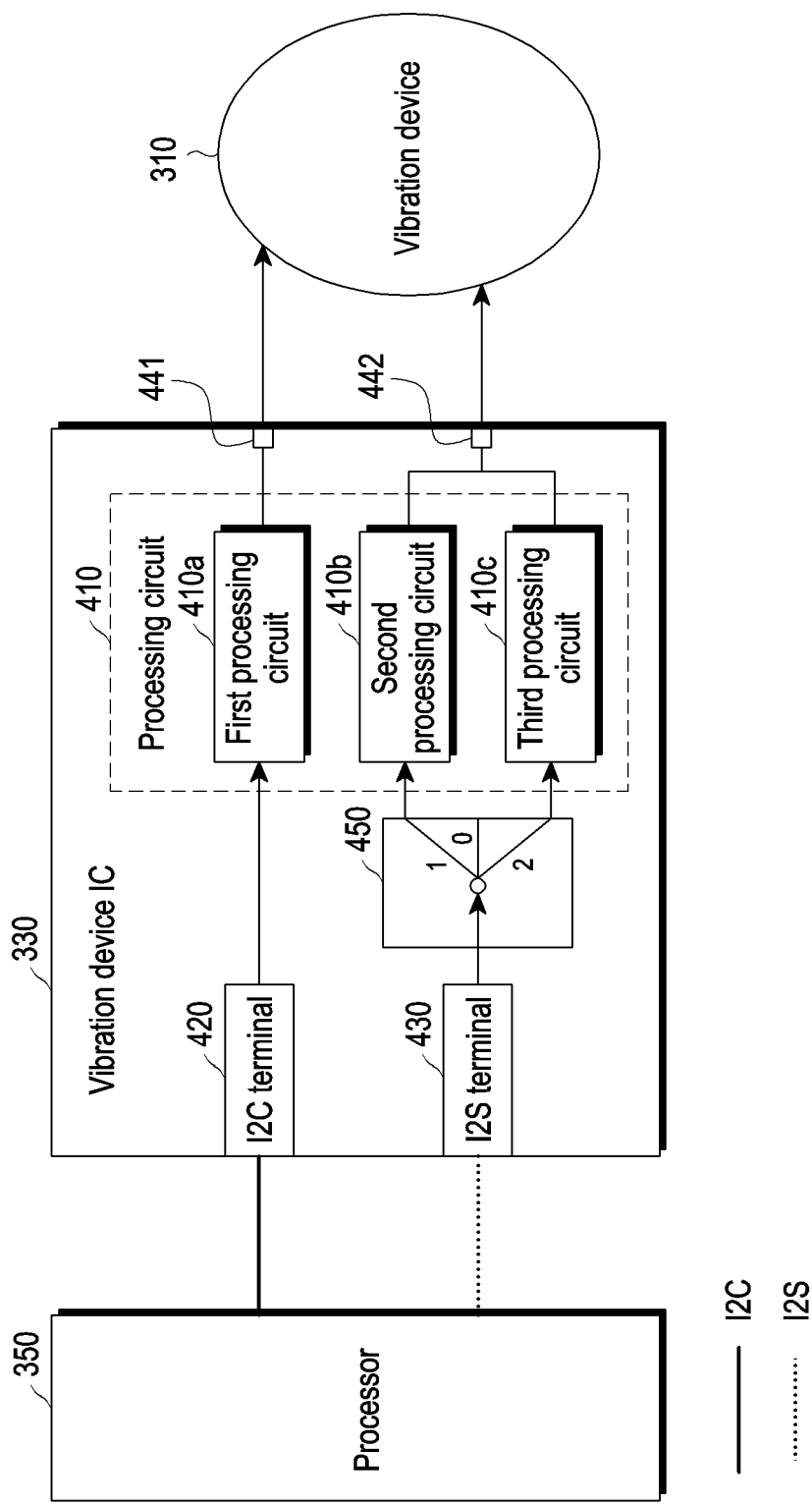
FIG. 4B is a view illustrating an example of a selection circuit of a vibration device IC according to various embodiments.
Figure 5:
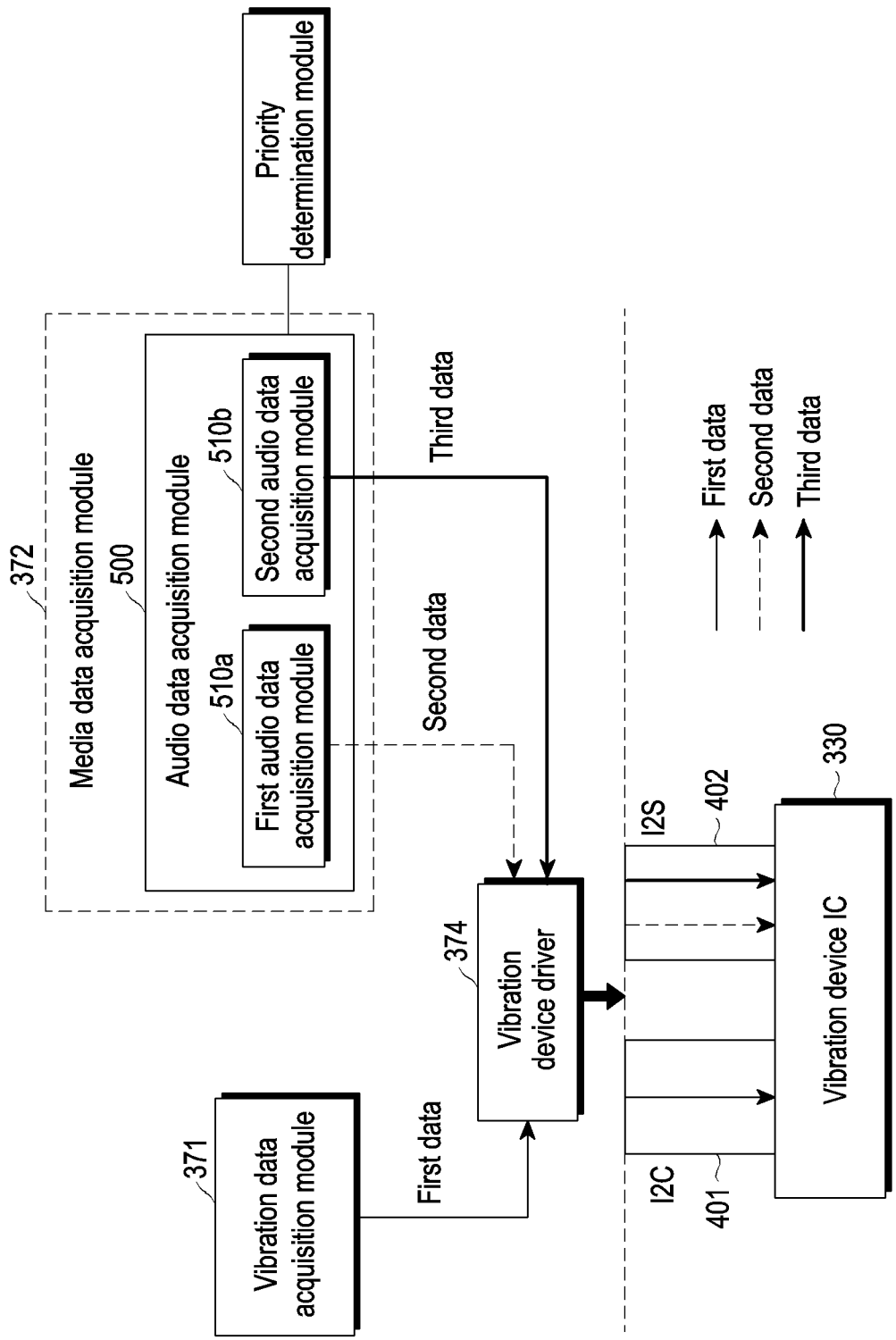
FIG. 5 is a view illustrating an example of an operation of transferring a haptic source to a vibration device IC through different communication interfaces using a vibration device driver of a processor according to various embodiments.
Figure 6:
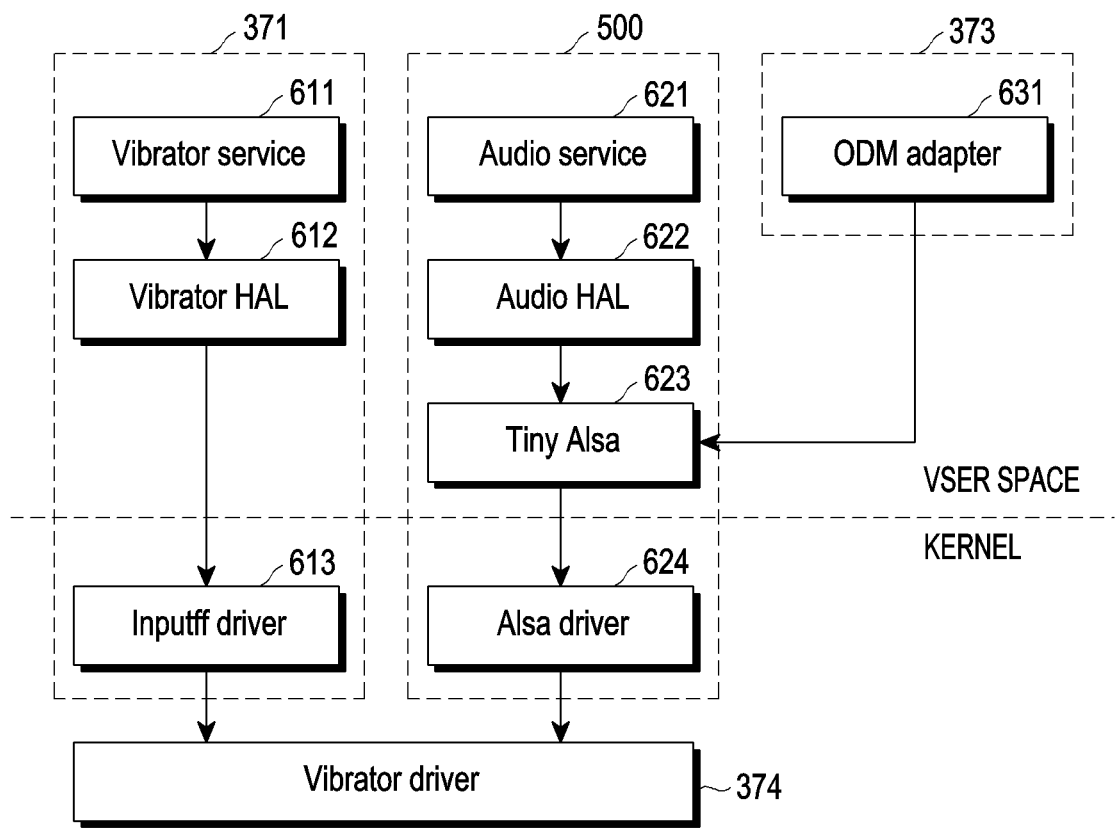
FIG. 6 is a view illustrating an example of a softwarewise configuration of an electronic device according to various embodiments.

FIG. 4A is a view illustrating an example of a processor 350 and a vibration device IC 330 connected via different communication interfaces (e.g., I2C bus 401 and I2S bus 402) according to various embodiments. FIG. 4B is a view illustrating an example of a selection circuit of a vibration device IC 330 according to various embodiments. FIG. 5 is a view illustrating an example of an operation of transferring a haptic source to a vibration device IC 330 through different communication interfaces (e.g., I2C bus 401 and I2S bus 402) using a vibration device driver 374 of a processor 350 according to various embodiments. FIG. 6 is a view illustrating an example of a softwarewise configuration of an electronic device 200 according to various embodiments.

According to various embodiments, an electronic device 200 may include a vibration device 310, a vibration device IC 330, a media device 320, a media device IC 340, a processor 350, and a memory 360 including a plurality of modules 300 (e.g., a priority determination module 373, a vibration data acquisition module 371, a media data acquisition module 372, and a vibration device driver 374). Meanwhile, without being limited to the components illustrated in FIG. 4A, the electronic device 200 may be implemented to include more or fewer components. For example, the electronic device 200 may be implemented to further include components of the electronic device 101 described with reference to FIG. 1. Hereinafter, an example of a configuration of the electronic device 200 according to various embodiments is described.

First, examples of the vibration device 310 and the media device 320 according to various embodiments are described.

According to various embodiments, the vibration device 310 may generate vibration under the control of the vibration device IC 330. For example, the vibration device 310 may include a motor (not shown) and a rotation weight (not shown) connected to the rotation shaft of the motor. As the motor (not shown) is driven based, at least in part, on data (e.g., pulse-width modulation (PWM) data) received from the vibration device IC 330, the rotation weight may be rotated about the rotation shaft of the motor (not shown), and the vibration may be generated from the vibration device 310 by rotation of the rotation weight. The generated vibration may lead the electronic device 200 including the vibration device 310 to vibrate. Accordingly, the user may receive a sense of vibration through the electronic device 200. Meanwhile, since it is well known that the vibration device 310 may be implemented in various examples without limited to the described example, a more detailed description will be omitted.

According to various embodiments, the media device 320 may be defined as devices implemented to provide various types of media content. The media content may include various types of content, such as visual content, auditory content, and tactile content. For example, as shown in FIG. 3, the media device 320 may include an audio device 321 for providing auditory content but, without limited thereto, may further include types of devices for providing various types of content, such as a display.

An example of the vibration device IC 330 is described below according to various embodiments.

According to various embodiments, the vibration device IC 330 may include a processing circuit 410 implemented (or configured) to process the plurality of data received from the processor 350 to generate control data for driving the vibration device 310, a plurality of terminals 420, 430, and 440, a control circuit (not shown), and a memory (not shown) as shown in FIG. 4A. The processing circuit 410 memory a digital signal processing (DSP) circuit, a circuit corresponding to a specific coder (e.g., codec or decodec), and/or an amp circuit for converting input data into data (e.g., PWM data) for generating vibration. Meanwhile, without limited thereto, the data for generating vibration may further include at least one of serial data (SDA) or open wave table (OWT) data. Referring to FIG. 4B, the processing circuit 410 may include a plurality of processing circuits (e.g., a first processing circuit 410a, a second processing circuit 410b, and a third processing circuit 410c) for processing different data. The memory (not shown) may store a program (e.g., firmware and/or software) for overall controlling the vibration device IC 330. When the firmware is executed, the control circuit (not shown) of the vibration device IC 330 can select data corresponding to the received HS value, described below, from among the plurality of data (e.g., index data, A2H data, and ACH data described below) received by the vibration device IC 330 and/or process the data (e.g., index data, A2H data, and ACH data described below) selected by the vibration device IC 330, using the processing circuit 410 to thereby generate the data (e.g., PWM data) for driving the vibration device 310. Meanwhile, without limited thereto, the data for generating vibration may further include at least one of SDA or OWT data. Meanwhile, without limited thereto, as shown in FIG. 4B, the vibration device IC 330 may further include a hardware selection circuit 450 for selecting data from among the plurality of data (e.g., index data, A2H data, and ACH data described below) received from the processor 350, but not limited thereto.

According to various embodiments, the plurality of terminals 420, 430, and 440 may include terminals 420 and 430 for connection to a plurality of communication interfaces 401 and 402 connected to the processor 350 and terminals 440 connected to the vibration device 310. For example, referring to FIG. 4A, the plurality of communication interfaces 401 and 402 may include a plurality of buses (e.g., an I2C bus 401 and an I2S bus 402). The plurality of terminals may include the I2C terminals 421 and 422 connected to the I2C buses 401a and 401b and the I2S terminals 431, 432, and 433 connected to the I2S buses 402a, 402b, and 402c. Accordingly, the vibration device IC 330 may be connected to the processor 350 via the I2C bus 401 connected to the I2C terminals 421 and 422 and the I2S bus 402 connected to the I2S terminals 431, 432 and 433. Further, the plurality of terminals may include output terminals 441 and 442 connected to the vibration device 310. Data (e.g., PCM data) for driving the vibration device 310 may be transferred through the output terminal.

The I2C bus 401, for example, may be a serial bus for data transmission and/or data reception between the processor 350 and other electronic components (e.g., the vibration device IC 330) in the electronic device 200. The I2C bus 401 may include two transmission lines 401a and 401b, e.g., a serial clock line (SCL) and a serial data line (SDA). A clock signal for synchronization may be output from the processor 350 to electronic components through the SCL. Data (e.g., SDA data) may be transmitted and/or received between the processor 350 and the electronic component through the SDA line at the time corresponding to the clock signal. For example, the index data and/or HS value may be transferred from the processor 350 to the vibration device IC 330 through the I2C bus 401.

The I2S bus 402 may be a serial bus for other types of data and/or additional types of data compared to the data transmitted on the I2C bus 401. The I2S bus 402, for example, may be a serial bus for audio data transmission and/or audio data reception between the processor 350 and other electronic components (e.g., the vibration device IC 330) in the electronic device 200, or for image data transmission and/or image data reception between the processor 350 and other electronic components (e.g., the vibration device IC 330) in the electronic device 200. The audio data may, for example, include PCM data indicative of an audio haptic source. The I2S bus 402 may include three transmission lines 402a, 402b, and 402c, e.g., a serial clock SCK, a word select WS, and an SDA. A clock signal for synchronization may be output from the processor 350 to electronic components through the SCK. A word selection signal may be transmitted to the processor 350 and electronic components through the WS. Audio data may be transmitted from the processor 350 to the electronic components through the SD. In this case, the transmission may be unidirectional. For example, A2H data and/or ACH data may be transferred from the processor 350 to the vibration device IC 330 through the I2S bus 402.

Meanwhile, the type of data transferred through the I2C bus 401 and the type of data transferred through the I2C bus 402 may be different from each other.

According to various embodiments, the selection circuit 450 may include a 1-in 2-out multiplexer (MUX). For example, the input terminal of the multiplexer may be connected to the I2S terminal 430, and each of the two output terminals may be connected to a different processing circuit (e.g., the second processing circuit 410b and the third processing circuit 430b). In this case, the I2C terminal 420 may be connected to the other first processing circuit 410a. Meanwhile, without limited to those described and/or shown, at least some of the processing circuits (e.g., the first processing circuit 410a, the second processing circuit 420a, and the third processing circuit 430a) connected to the I2C terminal 420 and the output terminals of the multiplexer may be implemented as the same processing circuit.

For example, the vibration device IC 330 (e.g., a control circuit (not shown)) may deactivate (e.g., HS=0) the multiplexer or electrically connect (HS=1 and HS=2) the input terminal with a specific processing circuit based on the value HS for selecting the haptic source received through the I2C bus 401 as shown in Table 1 below.

TABLE 1

| Received value (HS) | Multiplexer control operation |
| --- | --- |
| 0 | deactivate multiplexer |
| 1 | connect first output terminal |
| 2 | connect second output terminal |

Accordingly, when the HS value is 0, the vibration device IC 330 may process the first data (e.g., vibration data described below) received through the I2C terminal 420, using the first processing circuit 410a, thereby obtaining data (e.g., PWM) for driving the vibration device 310. Accordingly, when the HS value is 1, the vibration device IC 330 may process the second data (e.g., ACH data described below) received through the I2S terminal 430, using the second processing circuit 410b, thereby obtaining data (e.g., PWM) for driving the vibration device 310. Accordingly, when the HS value is 2, the vibration device IC 330 may process the third data (e.g., A2H data described below) received through the I2S terminal 430, using the third processing circuit 410c, thereby obtaining data (e.g., PWM) for driving the vibration device 310. Accordingly, specific data may be selected, as the data for generating vibration, from among the plurality of data (e.g., first data, second data, and third data) transferred through the I2C bus 401 and the I2S bus 402 to the vibration device IC 330, based on the value HS for selecting the haptic source. Meanwhile, a 1 in 2 out multiplexer has been exemplified as the selection circuit but, without limitations thereto, various types of electronic components may be implemented as the selection circuit 450. For example, the selection circuit may be implemented as a 2 in 1 out multiplexer, so that two input terminals of the multiplexer may be implemented to be connected to the I2C terminal 420 and the I2S terminal 430, respectively. Accordingly, when the HS value is 0, the input terminal and output terminal connected to the I2C terminal 420 may be electrically connected so that the index data received through the I2C terminal 420 is output through the output terminal of the multiplexer and, when the HS value is 1 or 2, the input terminal and output terminal connected to the I2S terminal 430 are electrically connected so that the A2H data and/or ACH data received through the I2S terminal 430 may be output through the output terminal of the multiplexer. Or, instead of the selection circuit 450, the program (e.g., firmware) implemented on the vibration device IC 330 may be softwarewise implemented to include the function of selecting specific data from among the plurality of data transferred to the vibration device IC 330 based on the HS value, as described above.

According to various embodiments, the vibration device IC 330 may control the vibration device 310 to generate vibration using the processing circuit 410. For example, as described above, the vibration device IC 330 may generate (or obtain) data (e.g., PWM data) for controlling the vibration device 310 of the vibration device IC 330 based on processing, using the processing circuit 410, the specific data selected from among the plurality of data received from the processor 350 through the plurality of communication interfaces (e.g., the I2C bus 401 and the I2S bus 402), based on the program (e.g., firmware) stored in the memory (not shown). The firmware of the vibration device IC 330 may be executed when the electronic device 200 is booted (or turned on). In an embodiment, when the index data received through the I2C bus 401 is selected, the vibration device IC 330 may generate data (e.g., PWM data) for generation of vibration based on a value included in the index data. For example, the value included in the index data is information representing a vibration of a specific pattern (e.g., magnitude, pattern), and the memory (not shown) of the vibration device IC 330 may previously store (or define) information for generating the vibration of the specific characteristic (e.g., magnitude or pattern) for each of the plurality of values that may be included in the index data. The vibration device IC 330 may obtain information for generating the vibration of the specific characteristic corresponding to the value included in the index data among the pre-stored information and use the processing circuit based on the obtained information, thereby generating data (e.g., PWM data) for providing the vibration of the specific characteristic. In another embodiment, when the ACH data or A2H data received through the I2S bus 402 is selected, the vibration device IC 330 may generate the data (e.g., PWM data) for generating the vibration corresponding to the value (or waveform) of the ACH data or A2H data (e.g., PCM data). The generated data (e.g., PWM data) for generating vibration may be implemented to provide the vibration of the characteristic corresponding to the value (or waveform) of the ACH data or A2H data (e.g., PCM data). The vibration device IC 330 may generate vibration by driving the vibration device 310 (e.g., motor (not shown)) based on the generated data (e.g., PWM data) for generating vibration. For example, the vibration device IC 330 may transfer the generated data (e.g., PWM data) for generating vibration through the output terminal 440 connected to the vibration device 310, and the vibration device 310 (e.g., motor) may be driven based on the received data (e.g., PWM data). Meanwhile, without limited thereto, the data for generating vibration may further include at least one of SDA or OWT data.

An example of the media device IC 340 is described below according to various embodiments.

According to various embodiments, the media device IC 340 may be implemented to control the media device 320 (e.g., the audio device 321). For example, the media device IC 340 may include an audio device IC 341 for controlling the audio device 321 but, without limitations thereto, may further include a media device IC 340 for controlling various types of media devices 320 for providing various types of content, such as a display device. For example, the media device IC 340 may drive the media device 320 (e.g., the audio device 321) based on media data (e.g., A2H data and ACH data described below) received from the processor 350. Since the technology for controlling the media device 320 of the media device IC 340 is well known, a detailed description thereof will be omitted.

Hereinafter, examples of the processor 350 and the programs (e.g., the modules 300, and the driver) executed by the processor 350 are described according to various embodiments.

According to various embodiments, the second processor 350 may include at least one of an application processor (AP), a central processing unit (CPU), a graphic processing unit (GPU), a display processing unit (DPU), or a neural processing unit (NPU).

According to various embodiments, modules 300 implemented (or stored) in the electronic device 200 (e.g., priority determination module 373, vibration data acquisition module 371, media data acquisition module 372, and vibration device driver 374) may be implemented in the form of an application, a program, computer code, instructions, a routine, a process, software, firmware, or a combination of at least two or more thereof, executable by the processor 350. For example, the modules 300 may be implemented as at least a portion of the program 140 of FIG. 1 (or may correspond to the program 140 of FIG. 1). For example, when the modules 300 (e.g., priority determination module 373, vibration data acquisition module 371, media data acquisition module 372, and vibration device driver 374) are executed, the processor 350 may perform an operation corresponding to each. Therefore, when it is described below that a specific module performs an operation, it may be understood as the processor 350 performing the operation corresponding to the specific module as the specific module is executed. Meanwhile, as is described below in FIG. 5, at least some of the modules 300 (e.g., priority determination module 373, vibration data acquisition module 371, media data acquisition module 372, and vibration device driver 374) may include a plurality of programs, but not limited thereto. For example, at least some of the modules 300 (e.g., priority determination module 373, vibration data acquisition module 371, media data acquisition module 372, and vibration device driver 374) may be implemented in the form of hardware (e.g., the processing circuit 410).

According to various embodiments, the vibration data acquisition module 371 may be implemented to obtain first data for generating vibration when an event for providing vibration occurs in the electronic device 200. Further, the vibration data acquisition module 371 may be implemented to control the processor 350 to transfer the first data to the vibration device IC 330 through the I2C bus 401. For example, the event (hereinafter, vibration event) may be an event for generating a preset vibration in the electronic device 200, and may be an event implemented to generate a vibration having a specific characteristic (e.g., specific magnitude or specific pattern). The pattern may indicate the magnitude of vibration according to time. Although not shown, information about the vibration event may be managed in a module (not shown) (e.g., a window manager) for managing the event. Meanwhile, without limited to those described and/or shown, the vibration event may indicate a state in which an audio event is not generated. For example, the first data may be index data to be described below. For example, the vibration data acquisition module 371 may correspond to the generated vibration event and obtain the index data for generating (or indicating or corresponding to) the vibration having the specific characteristic (e.g., specific magnitude or specific pattern) based on at least one of the value indicating a preset vibration magnitude or the value indicating a vibration effect. For example, the index data may include the value for generating (or indicating or corresponding to) the vibration having a specific characteristic (e.g., specific magnitude or specific pattern). Information for generating the vibration of the specific characteristic corresponding to each of the plurality of values included in the index data may be pre-stored (or pre-defined) in the vibration device IC 330. As a result, the vibration of the characteristic corresponding to the value included in the index data may be generated by the vibration device IC 330. The term "index data" is one merely for convenience of description and, without limited to those described, may be understood as various terms (e.g., SDA data). Specifically, referring to FIG. 6, the vibration data module may include a vibrator service module 611, a vibrator HAL (hardware abstraction layer) module 612, and an InputFF (force feedback) driver 613. For example, the vibrator service module 611 may obtain at least one of the value indicating the magnitude of vibration or the value indicating the effect of vibration based on at least one function (e.g., API) based on the occurrence of a vibration event associated with the application (e.g., notification application or phone application). The vibrator HAL module 612 may transfer at least one of the obtained value indicating the vibration magnitude and the value indicating the vibration effect to the InputFF driver 613 implemented in the kernel (e.g., Linux kernel). The InputFF driver 613 may obtain first data (e.g., index) for generating (or indicating or representing or corresponding to) the vibration of a specific magnitude and specific pattern based on the value indicating the value indicating the vibration magnitude or value indicating the vibration effect and transfer the first data to the vibration device driver 374 to allow the processor 350 to transfer the obtained first data to the vibration device driver 374 through the I2C bus 401.

According to various embodiments, the media data acquisition module 372 (e.g., audio data acquisition module 500) may be implemented to obtain data (e.g., second data and third data) for generating vibration when an event (hereinafter, audio data) for providing (or playing or outputting) media content (e.g., audio) occurs in the electronic device 200. Further, the media data acquisition module 372 (e.g., audio data acquisition module 500) may be implemented to control the processor 350 to transfer data (e.g., second data and third data) to the vibration device IC 330 through the I2S bus 402. Further, the media data acquisition module 372 (e.g., audio data acquisition module 500) may be implemented to provide a mixer control function.

For example, the second data may include ACH data to be described below, and the third data may include A2H data. For example, as described below in Table 2, information about a specific function (or method or scheme) (e.g., an audio to haptics (A2H) function or an audio coupled haptics (ACH) function) for providing vibration for each audio event for outputting (or providing) audio may be previously stored in the electronic device 200. The audio data acquisition module 500 may obtain data (e.g., ACH data and A2H data) for providing vibration for each generated audio event, based on the pre-stored information described in Table 2. The audio events may be generated based on the execution of an application.

TABLE 2

| Event category | Audio event | A2H/ACH | Operating conditions (profile) | Remarks |
|---|---|---|---|---|
| Notifications | Ringtone (Default ringtone) | ACH | Sound/Vibration/ Mute mode | Output of vibration pattern synchronized with ring tone |
| | Message Alert (Default noti.) | ACH | Sound/Vibration/ Mute mode | Vibration pattern output synchronized with basic notification sound |
| | E-mail alert | ACH | follows app settings | Vibration pattern output synchronized with email notification sound |
| | Calendar schedule alert | ACH | follows app settings | Vibration pattern output synchronized with schedule notification sound |
| | Calendar schedule alarm | ACH | follows app settings | Vibration pattern output synchronized with schedule alarm |
| | Reminder noti. | ACH | follows app settings | Vibration pattern output synchronized with notification sound |
| | Reminder alarm | ACH | follows app settings | Vibration pattern output synchronized with reminder alarm |
| | Timer | ACH | follows app settings | Vibration pattern output synchronized with timer alarm sound |
| | Alarm | ACH | follows app settings | Vibration pattern output synchronized with alarm sound |
| System | Screen Capture | ACH | Sound/Vibration/ Mute mode | Capture sound + capture vibration synchronized output |
| | Booting sound | ACH | Sound/Vibration/ Mute mode | Vibration synchronized output when boot animation sound source is applied |
| | Power off | ACH | Sound/Vibration/ Mute mode | Vibration synchronized output when power off animation is applied |
| | Unlock_VA_Mode | ACH | Sound/Vibration/ Mute mode | Screen unlock sound + vibration synchronized output |
| Media | Gaming | A2H | Sound/Vibration/ Mute mode | Applies game-only A2H solution |
| | Music | A2H | Sound/Vibration/ Mute mode | Vibe woofer concept (vibration woofer) |
| | Video player(Gallery) | A2H | Sound/Vibration/ Mute mode | Vibration pattern output synchronized with video sound |
| composite operation | composite operation | A2H/ ACH | Sound/Vibration/ Mute mode | Notification (ACH) output during media operation (A2H) |

For example, the A2H function may be a function for obtaining audio data (e.g., PCM data) for outputting audio from an audio file (e.g., a wave file) and providing vibration based on audio data (e.g., PCM data). For convenience of description, the obtained audio data (e.g., PCM data) may be defined as A2H data. As another example, the ACH function may be a function for obtaining haptic data (e.g., second PCM data) for providing vibration, included separately from audio data (e.g., first PCM data) for outputting audio in an audio file (e.g., an OGG file) and providing vibration based on the obtained haptic data. For convenience of description, the haptic data (e.g., second PCM data) may be defined as ACH data. The audio data and haptic data included in the file implemented to provide the ACH function may include different values for each time period. For example, in a case where the value of a specific time period corresponding to the audio data in the OGG file is 0 so that a sound is not provided in the specific time period, the value of the haptic data in the OGG file exists, so that vibration may be provided in the specific time period. According to various embodiments, the type of the audio file for audio output (or playback or provision) obtained for each function (e.g., A2H function, and ACH function) corresponding to an audio event may be changed. For example, when an event corresponding to the A2H function occurs, an audio file (e.g., a wave file) in a format including audio data (e.g., PCM data) may be obtained. As another example, when an event corresponding to the ACH function occurs, an audio file (e.g., an OGG file) in a format including the haptic data (e.g., PCM data) for providing vibration, as well as the audio data (e.g., PCM data) for audio output, may be obtained.

According to various embodiments, as set forth in Table 2, if a specific audio event occurs, the audio data acquisition module 500 may obtain data (e.g., PCM data) for providing vibration according to the A2H function and/or ACH function corresponding to the specific audio event. In an embodiment, when an audio event corresponding to the ACH function occurs, the first audio data acquisition module 510a may obtain the haptic data (e.g., PCM data), as the ACH data, for providing vibration (or from the data having the extension of the haptic data of the audio file and/or the haptic channel or data area of the audio file including the haptic data), included in the audio file, based on analyzing the audio file (e.g., an OGG file) (e.g., metadata parsing). Further, in an embodiment, when an audio event corresponding to the A2H function occurs, the second audio data acquisition module 510b may obtain the audio data (e.g., PCM data), as the A2H data, for providing audio (or from the audio channel and/or data area of the audio file including the audio data), included in the audio file, based on analyzing the audio file (e.g., wave file) (e.g., metadata parsing).

Meanwhile, although not shown, the audio data acquisition module 500 may obtain the audio data obtained from the audio file and may be implemented to control the processor 350 to transfer the audio data to the audio device IC 341. For example, the audio data acquisition module 500 may transfer the audio data obtained from the audio file to the audio device 321 driver, and the audio device 321 driver may control the processor 350 to transfer the audio data to the audio device IC 341 via a specific communication interface. Accordingly, audio may be output by the audio device 321 while vibration is simultaneously generated by the vibration device 310 based on the audio file.

Specifically, referring to FIG. 6, the audio data acquisition module 500 may include an audio service module 621, an audio HAL module 622, a tiny Alsa module 623, and an Alsa driver 624 (or advanced Linux sound architecture for SOC (ALSA/ASOC) driver). For example, the audio service module may obtain an audio file (e.g., audio file including PCM data) of the type corresponding to the audio event based on at least one function (e.g., API) based on the occurrence of the audio event associated with an application (e.g., notification application or phone application). The audio service module 621 may obtain the second data (e.g., ACH data) and/or third data (e.g., A2H data) from the audio file according to the function (e.g., A2H function and/or ACH function) corresponding to the occurrence of the generated audio event. The audio HAL module 622 may obtain the data (e.g., A2H data, and/or ACH data) and transfer it to the tiny Alsa module 623 implemented in the kernel (e.g., Linux kernel). The tiny Alsa module 623 may transfer the data (e.g., A2H data, and/or ACH data) to the Alsa driver 624. Meanwhile, the tiny Alsa module 623 may receive a value (e.g., HS value) for determining a haptic source from the priority determination module 373 to be described below and may transfer the obtained value (e.g., HS value) together with data (e.g., A2H data, and/or ACH data) to the Alsa driver 624. The Alsa driver 624 may transfer the HS value to the vibration device driver 374 to control the processor 350 to transfer the obtained data (e.g., A2H data and/or ACH data) to the vibration device IC 330 through the I2S bus 402. Meanwhile, the Alsa driver 624 may transfer the HS value to the vibration device driver 374 so that the processor 350 transfers the obtained HS value to the vibration device IC 330 through the I2C bus 401.

Meanwhile, at least a portion of the vibration data acquisition module 371 may communicate with (e.g., read and/or write data) at least a portion of the audio data acquisition module 500. For example, the vibrator service module 611 and the audio service module 621 may communicate with each other. Accordingly, the audio data acquisition module 500 may set the HS value to 0 based on information indicating the generation of the vibration event received from the vibration data acquisition module 371.

Although the audio data acquisition module 500 has been exemplified, the described example may also be applied to description of modules (e.g., an image data module) for providing other types of content (e.g., image content) other than the audio data acquisition module 500. For example, the image data module may be implemented to control to obtain haptic data for providing vibration based on an image file for providing image content and transfer the obtained data to the vibration device IC 330 through a specific communication interface.

According to various embodiments, the priority determination module 373 may be implemented to control the vibration device IC 330 to transfer, to the vibration device IC 330, a value (e.g., HS value) for determining data for generating vibration. For example, the priority determination module 373 may determine the HS value based on the occurrence of the audio event described above in connection with Table 2 and/or a vibration event. As an example, the priority determination module 373 may determine that the HS value is 2 when the audio event corresponding to the A2H function occurs. As an example, the priority determination module 373 may determine that the HS value is 1 when the audio event corresponding to the ACH function occurs. As another example, the priority determination module 373 may determine that the HS value is 0 when the audio event corresponding to the A2H function and/or ACH function does not occur (i.e., normal time or as default) and/or when a vibration event occurs. Specifically, referring to FIG. 6, the priority determination module 373 may include an ODM adapter module 631. The ODM adapter module 631 may obtain the HS value based on the occurrence of the event (e.g., vibration event or audio event) and transfer it to the Tiny Alsa module 624. The Tiny Alsa module 623 may transfer the HS value to the Alsa driver 624. The Alsa driver 624 may transfer the HS value to the vibration device driver 374 so that the processor 350 transfers the obtained HS value to the vibration device IC 330 through the I2C bus 401.

According to various embodiments, the vibration device driver 374 may be configured to control the processor 350 to transfer predetermined data to the vibration device IC 330 through the plurality of communication interfaces (e.g., I2C bus 401 and I2S bus 402). For example, the vibration device driver 374 may be implemented in the form of a multi-function device (MFD) driver. In an embodiment, the vibration device driver 374 may control the processor 350 to transfer the first data (e.g., index) obtained by the vibration data acquisition module 371 (e.g., Inputff driver) to the vibration device IC 330 through the I2C bus 401. In another embodiment, the vibration device driver 374 may control the processor 350 to transfer the second data (e.g., ACH data) and/or third data (e.g., A2H data) obtained by the audio data acquisition module 500 (e.g., Alsa driver) to the vibration device IC 330 through the I2S bus 402 and transfer the HS value to the vibration device IC 330 through the I2C bus 401. Accordingly, as described above, the vibration device IC 330 may drive the vibration device 310 based on the data (e.g., first data, second data, and third data) selected based on the HS value.

An example of an operation of an electronic device 200 is described below according to various embodiments.

According to various embodiments, the electronic device 200 (e.g., processor 350) may transfer the data (e.g., index data, A2H data, and ACH data described above in connection with FIGS. 3 to 6) for generating vibration, to the vibration device IC 330 through different buses.

Figure 7:
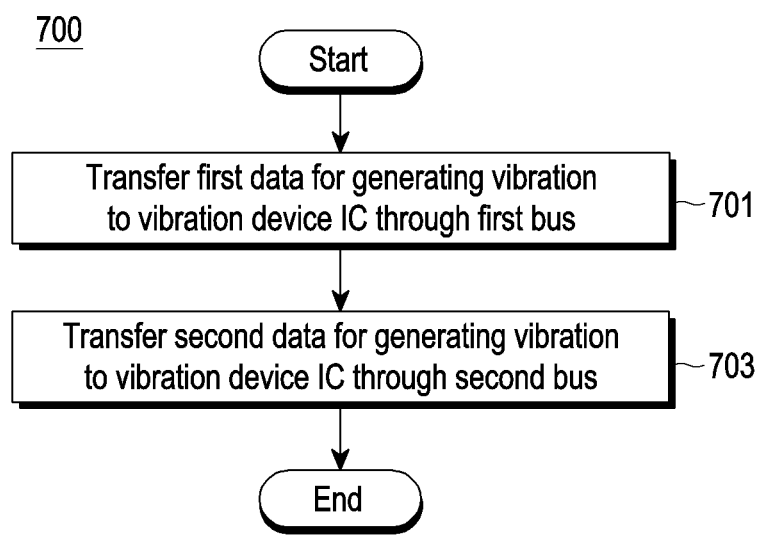
FIG. 7 is a flowchart illustrating an example of an operation of an electronic device according to various embodiments.

FIG. 7 is a flowchart 700 illustrating an example of an operation of an electronic device 200 according to various embodiments. According to various embodiments, the operations shown in FIG. 7 are not limited to the shown order but may rather be performed in other various orders. According to various embodiments, more or less operations than those of FIG. 7 may be performed.

According to various embodiments, in operation 701, the electronic device 200 may transfer first data for generating vibration to the vibration device IC 330 through a first bus. For example, the electronic device 200 (e.g., processor 350) may transfer, to the vibration device IC 330 through the I2C bus 401, index data (e.g., first data) for generating vibration of a specific pattern and specific magnitude, obtained based on the occurrence of the above-described vibration event. The vibration device IC 330 may obtain data (e.g., PWM data) for generating vibration by processing the index data using the processing circuit 410, based on firmware and provide the obtained data to the vibration device 310. The vibration device 310 may be driven based on the data (e.g., PWM data), generating vibration. Meanwhile, the electronic device 200 (e.g., processor 350) may transfer an HS value for selecting a haptic source to the vibration device IC 330 through the I2C bus 401.

According to various embodiments, in operation 703, the electronic device 200 may transfer second data for generating vibration to the vibration device IC 330 through a second bus. For example, the electronic device 200 (e.g., the processor 350) may obtain A2H data and/or ACH data as second data based on the occurrence of the above-described audio event in Table 2 and may transfer the obtained A2H data and/or ACH data to the vibration device IC 330 via the I2S bus 402. The vibration device IC 330 may obtain ACH data and/or A2H data for generating vibration by processing the index data using the processing circuit 410, based on firmware and provide the obtained data to the vibration device 310. The vibration device 310 may be driven based on the data (e.g., PWM data), generating vibration.

An example of an operation of an electronic device 200 is described below according to various embodiments.

According to various embodiments, the electronic device 200 (e.g., processor 350) may transfer the data (e.g., index data, A2H data, and ACH data described above in connection with FIGS. 3 to 6) for generating vibration, to the vibration device IC 330 through different buses. In this case, the electronic device 200 (e.g., the processor 350) may control the vibration device IC 330 to drive the vibration device 310 based on specific data selected from among the plurality of data (e.g., index data, A2H data, and ACH data).

Figure 8:
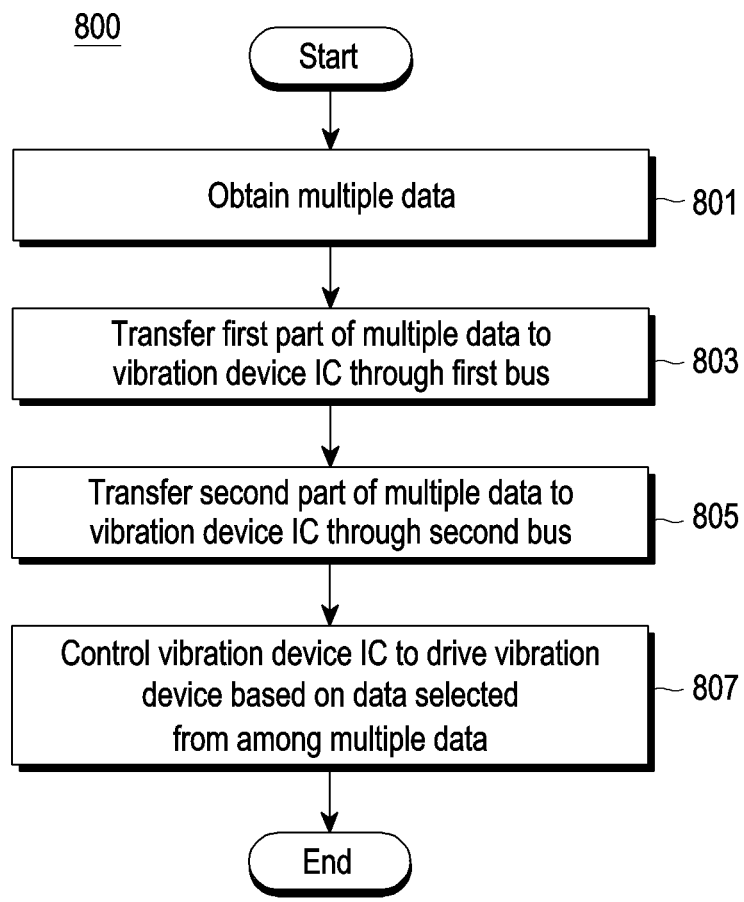
FIG. 8 is a flowchart illustrating an example of an operation of an electronic device according to various embodiments.

FIG. 8 is a flowchart 800 illustrating an example of an operation of an electronic device 200 according to various embodiments. According to various embodiments, the operations shown in FIG. 7 are not limited to the shown order but may rather be performed in other various orders. According to various embodiments, more or less operations than those of FIG. 8 may be performed. FIG. 8 is described below with reference to FIG. 9.

Figure 9:
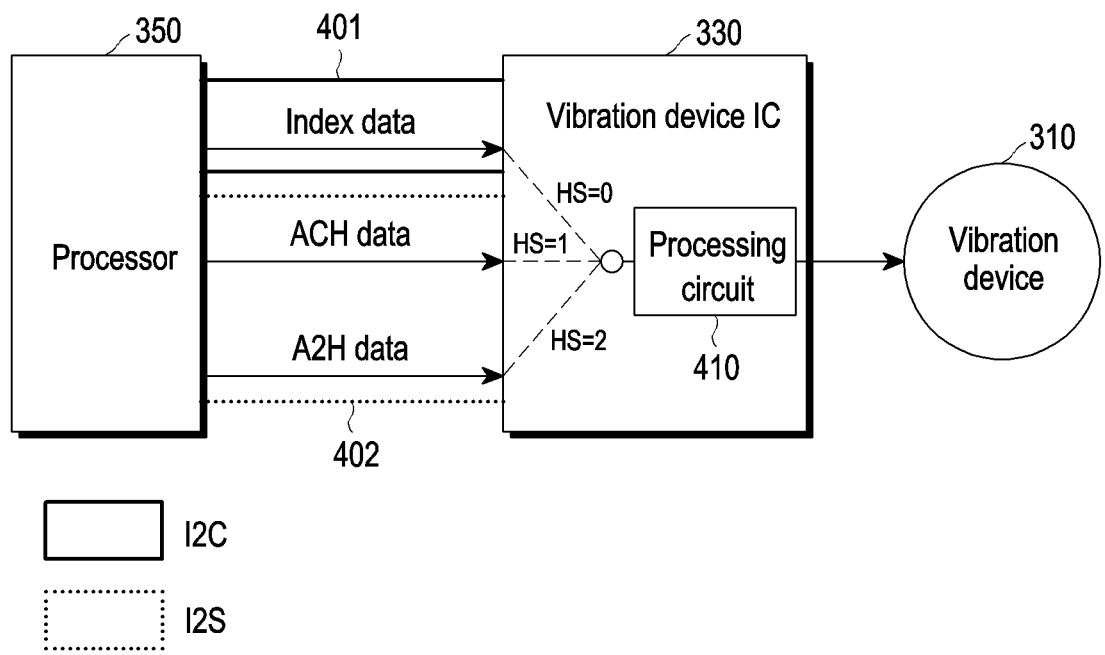
FIG. 9 is a view illustrating an example of an operation of controlling a vibration device based on a plurality of data of an electronic device according to various embodiments.

FIG. 9 is a view illustrating an example of an operation of controlling a vibration device 310 based on a plurality of data (e.g., index data, A2H data, and ACH data) of an electronic device 200 (e.g., processor 350) according to various embodiments.

According to various embodiments, in operation 801, the electronic device 200 may obtain a plurality of data for generating vibration. In one or more non-limiting embodiments, the obtained data includes different types of data. For example, the electronic device 200 (e.g., processor 350) may obtain index data for generating vibration of a specific pattern and specific magnitude based on the occurrence of the above-described vibration event and/or obtain the A2H data based on the occurrence of the above-described audio event in Table 2. As an example, as described above in connection with Table 2, in a case where the vibration event (e.g., alarm) set in the electronic device occurs while the audio event corresponding to a specific function occurs and the audio file is obtained and/or played back, the electronic device 200 (e.g., processor 350) may obtain index data along with the ACH data and/or A2H data. As an example, while the audio event corresponding to the ACH function occurs and ACH data is obtained as a game application is executed, a vibration event may be generated so that index data may be obtained.

According to various embodiments, in operation 803, the electronic device 200 may transfer first part of a plurality of data to the vibration circuit through the first bus and, in operation 805, transfer second part of the plurality of data to the vibration circuit through the second bus. Referring to FIG. 9, for example, the electronic device 200 (e.g., processor 350) may transfer the index data (e.g., first data) to the vibration device IC 330 through the I2C bus 401. As another example, referring to FIG. 9, the electronic device 200 (e.g., processor 350) may transfer the ACH data and/or A2H data to the vibration device IC 330 through the I2S bus 402.

According to various embodiments, in operation 807, the electronic device 200 may control the vibration circuit to drive the vibration device 310 based on data selected from among the plurality of data. For example, the electronic device 200 (e.g., processor 350) may transfer a value (e.g., HS value) for selecting data for generating vibration through the I2C bus 401 to the vibration device IC 330. Accordingly, as described above in connection with Table 1, referring to FIG. 9, the vibration device IC 330 may select specific data from among the plurality of data (e.g., index data, A2H data, or ACH data) based on the HS value. The vibration device IC 330 may process the specific data using the processing circuit 410 based on the firmware stored in the memory (not shown), obtaining data (e.g., PWM data) for driving the vibration device 310. The vibration device IC 330 may drive the vibration device 310 based on the data (e.g., PWM data), thereby providing vibration. For example, in a case where the HS value is a value indicating the index data, as described above, the electronic device 200, as a vibration event (e.g., notification) is generated while the audio event corresponding to the specific function is generated so that vibration is provided based on the data (e.g., A2H data and/or ACH data) obtained from the audio file, the electronic device 200 may temporarily stop the operation of providing vibration based on the data (e.g., A2H data and/or ACH data) obtained from the audio file and perform the operation of providing vibration based on index data. When the generation of the index data is stopped, and the data (e.g., index data, A2H data, and ACH data) obtained from the audio file is still obtained, the electronic device 200 may resume the operation of providing battery based on the data (e.g., A2H data, and ACH data) obtained from the audio file.

Meanwhile, when a single event occurs, the electronic device 200 (e.g., processor 350) may transfer only data corresponding to the occurring event to the vibration device IC 330 through a specific bus. Even in this case, the electronic device 200 (e.g., processor 350) may transfer the HS value to the vibration device IC 330. However, without limited to those described, the electronic device 200 may be implemented not to perform the operation of obtaining the HS value and/or the operation of transferring the HS value to the vibration device IC 330 when a single event occurs.

According to various embodiments, when a plurality of events (e.g., vibration event and audio event) occur, the electronic device 200 (e.g., processor 350) may determine the HS value according to the priority of the haptic source (e.g., index data, A2H data, and ACH data). For example, the index data may be set to have the highest priority, the A2H data may be set to have the lowest priority, and the ACH data may be set to have the priority lower than the priority of the index data and higher than the priority of the A2H data. However, without limited to those described, the priority may be set per data type. The processor 350 (e.g., priority determination module 373) may determine the HS value corresponding to the type of data having the highest priority as described in Table 3 among the plurality of data obtained according to the occurrence of the plurality of events.

TABLE 3

| HS value | Type of data |
|---|---|
| 0 | index data |
| 1 | ACH data |
| 2 | A2H data |

For example, when index data, ACH data, and A2H data are obtained, the processor 350 (e.g., priority determination module 373) may determine that the HS value is 0 which corresponds to the index data having the highest priority. As another example, when ACH data and A2H data are obtained, the processor 350 (e.g., priority determination module 373) may determine that the HS value is 1 which corresponds to the ACH data having the highest priority.

Accordingly, as described above, the electronic device 200 may change the data for generating vibration according to time, based on the received HS value, thereby performing the operation of providing vibration based on different types of haptic sources.

Meanwhile, without limited to those described in Table 3, the HS value may be implemented as a value indicating the type of event, instead of data type. Per-event priorities may be set in the electronic device 200. The electronic device 200 may determine the HS value indicating the type of event having the highest priority among the currently generated events. In this case, the electronic device 200 may transfer the HS value, along with the value (event value) indicating the type of event associated with the data (e.g., index data, A2H data, and ACH data) obtained according to the occurrence of event, to the vibration device IC 330 through I2C. Accordingly, the vibration device IC 330 may select data having the event value corresponding to the HS value and generate vibration based on the selected data.

An example of an operation of an electronic device 200 is described below according to various embodiments.

According to various embodiments, the vibration device IC 330 may obtain data (e.g., index data, A2H data, and ACH data described above in connection with FIGS. 3 to 6) for generating vibration through different buses from the processor 350 and obtain data (e.g., PWM data) for driving the vibration device 310 based on the obtained data.

Figure 10:
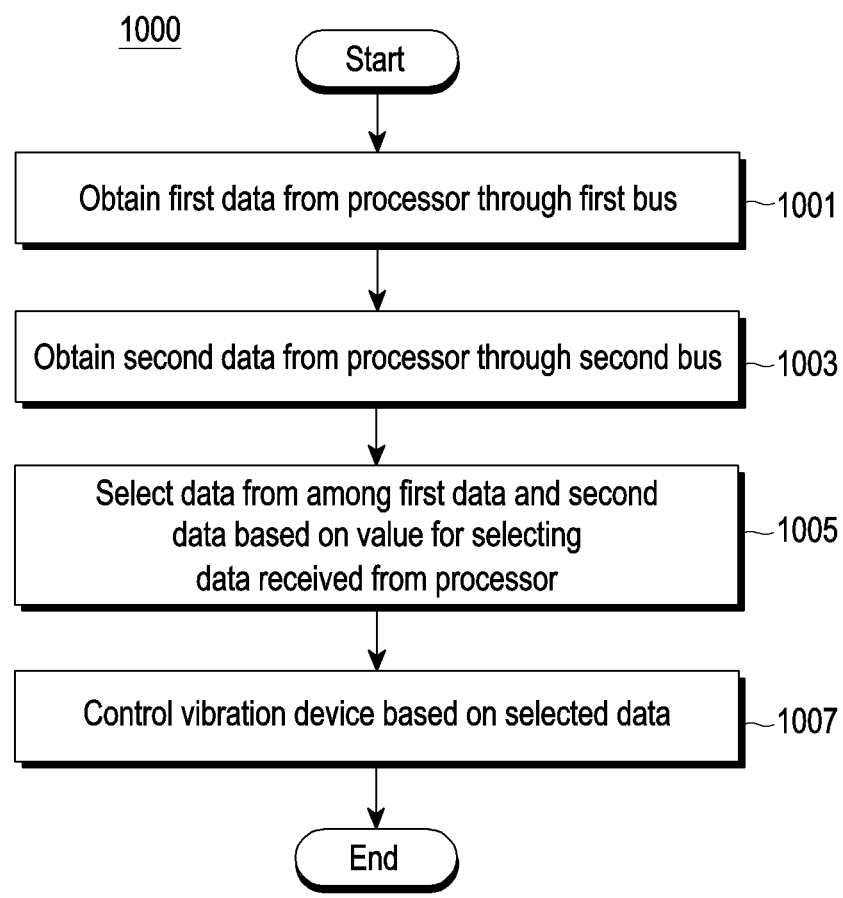
FIG. 10 is a flowchart illustrating an example of an operation of an electronic device according to various embodiments.

FIG. 10 is a flowchart 1000 illustrating an example of an operation of an electronic device 200 according to various embodiments. According to various embodiments, the operations shown in FIG. 10 are not limited to the shown order but may rather be performed in other various orders. According to various embodiments, more or less operations than those of FIG. 10 may be performed.

According to various embodiments, in operation 1001, the vibration device IC 330 may obtain first data from the processor 350 through the first bus and, in operation 1003, obtain second data from the processor 350 through the second bus. For example, the vibration device IC 330 may obtain the index data (e.g., first data) through the I2C bus 401 from the processor 350 and/or obtain ACH data and/or A2H data (e.g., second data) through the I2C bus 401 from the processor 350.

According to various embodiments, in operation 1005, the vibration device IC 330 may select data for generating vibration among the first data and second data based on the value for selection of the received data from the processor 350 and, in operation 1007, control the vibration device 310 based on the selected data. For example, the vibration device IC 330 may receive the above-described HS value through the I2C bus 401 from the processor 350. The vibration device IC 330 may select the data corresponding to the HS value from among the plurality of data (e.g., index data, A2H data, and ACH data) and obtain the data (e.g., PWM data) for driving the vibration device 310 based on the selected data. The vibration device IC 330 may drive the vibration device 310 based on the data (e.g., PWM data), generating vibration.

An example of an operation of an electronic device 200 is described below according to various embodiments.

According to various embodiments, the electronic device 200 (e.g., processor 350) may obtain data (e.g., index data, A2H data, and ACH data) for generating vibration according to the type of the generated event (e.g., vibration event and audio event) and determine the HS value.

Figure 11:
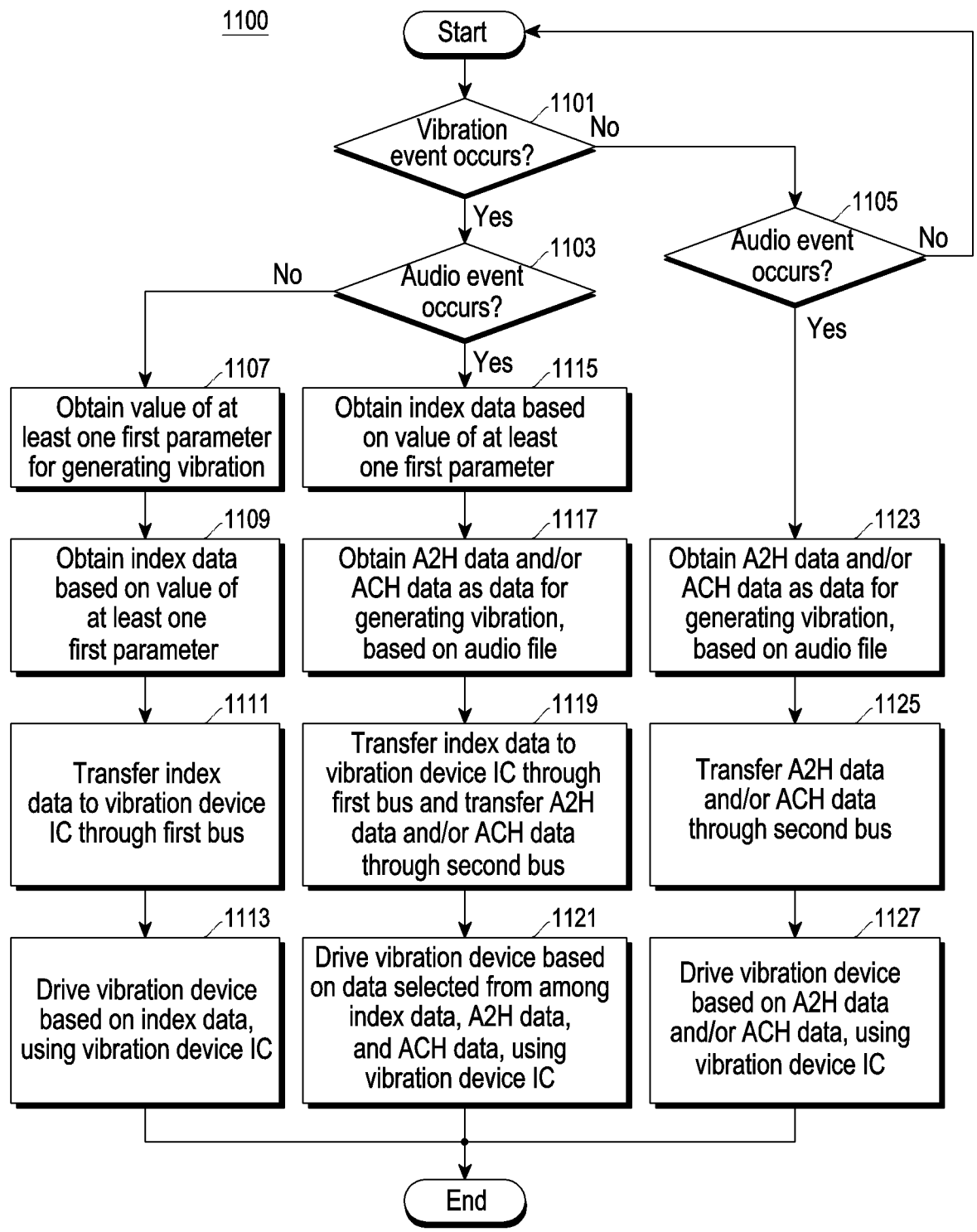
FIG. 11 is a flowchart illustrating an example of an operation of an electronic device according to various embodiments.

FIG. 11 is a flowchart 1100 illustrating an example of an operation of an electronic device 200 according to various embodiments. According to various embodiments, the operations shown in FIG. 11 are not limited to the shown order but may rather be performed in other various orders. According to various embodiments, more or less operations than those of FIG. 11 may be performed. FIG. 11 is described below with reference to FIG. 12.

Figure 12:
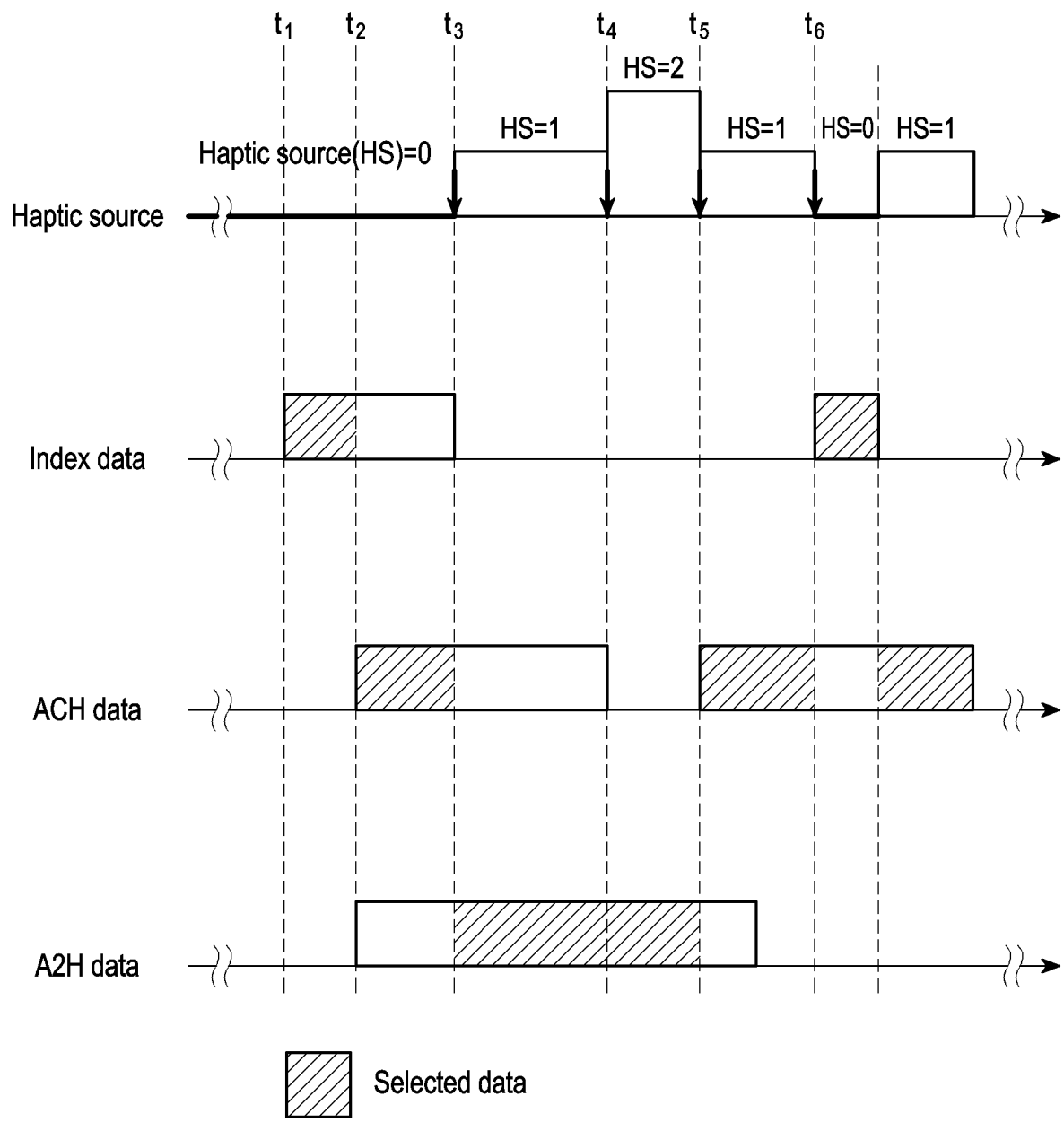
FIG. 12 illustrates graphs showing the presence or absence of data over time according to various embodiments.

FIG. 12 illustrates graphs showing the presence or absence of data (e.g., HS value, index data, A2H data, and ACH data) over time according to various embodiments. In each graph shown in FIG. 12, the x axis may denote the time, and the positive value of the y axis may denote the presence of data (that is, the absence of a positive value on the y axis may denote lack of data).

According to various embodiments, in operation 1101, the vibration device IC 330 may determine whether a vibration event occurs and, when a vibration event occurs (Yes in 1101), determine whether an audio event occurs in operation 1103 and, when no vibration event occurs, determine whether an audio event occurs in operation 1105. As described above in connection with FIGS. 3 to 6, the vibration event may be an event preset in the electronic device 200 to generate a vibration of a specific pattern and specific magnitude, and the audio event may be preset events for audio output described in Table 2. Meanwhile, without limited to those described and/or shown, the vibration event may mean a state in which an audio event is not generated.

According to various embodiments, when a vibration event occurs and no audio event occurs (No in 1103), the vibration device IC 330 may obtain the value of at least one first parameter for generating vibration in operation 1107, obtain index data based on the value of the at least one first parameter in operation 1109, transfer the index data to the vibration device IC 330 through the first bus in operation 1111, and drive the vibration device 310 based on the index data, using the vibration circuit in operation 1113. For example, referring to FIG. 12, as a vibration event occurs at a first time t1, the operation in which the electronic device 200 obtains index data based on the vibration event from the first time t1 to a third time t3 may be performed. As an example, as described above in connection with FIGS. 3 to 6, the electronic device 200 (e.g., vibration data acquisition module 371) may obtain the value of at least one first parameter including at least one of the value indicating a preset vibration magnitude or the value indicating the vibration effect, corresponding to the vibration event, based on the occurrence of the vibration event. The electronic device 200 (e.g., vibration data acquisition module 371) may obtain the index data for generating vibration of a specific pattern and specific magnitude, corresponding to the value of the at least one first parameter. Further, the electronic device 200 (e.g., processor 350) may determine that the HS value is 0 based on the vibration event. As a result, the electronic device 200 (e.g., processor 350) may transfer the HS value (HS=0) and index data determined from the first time t1 to the third time t3 to the vibration device IC 330 through the I2C bus 401. The vibration device IC 330 may obtain PWM data based on the index data from the first time t1 to the third time t3 and drive the vibration device 310 based on the PWM data.

Meanwhile, without limited to the described example, the electronic device 200 (e.g., processor 350) may determine that the HS value is 0 during the time when no event (e.g., vibration event and audio event) occurs.

According to various embodiments, when a vibration event occurs and no audio event occurs (Yes in 1103), the vibration device IC 330 may obtain index data based on the value of at least one first parameter in operation 1115, obtain ACH data and/or A2H data based on the audio file in operation 1117, transfer the index data to the vibration device IC 330 through the first bus and transfer the ACH data and/or A2H data through the second bus in operation 1119, and drive the vibration device 310 based on data selected from among the first vibration data, A2H data, and ACH data using the vibration circuit in operation 1121. For example, referring to FIG. 12, a first audio event corresponding to the ACH function and a second audio event corresponding to the A2H function may occur at a second time t2.

Accordingly, from the second time t2 to the third time t3, the operation of generating index data based on the vibration event of the electronic device 200, the operation of generating ACH data based on the first audio event, and the operation of generating the A2H data based on the second audio event may be performed. For example, the electronic device 200 (e.g., vibration data acquisition module 371) may obtain index data based on the value of at least one first parameter including at least one of the value indicating a preset vibration magnitude or the value indicating the vibration effect, corresponding to the vibration event. As another example, the electronic device 200 (e.g., audio data acquisition module 500) may obtain A2H data and ACH data from the audio file (e.g., wave file and OGG file) generated based on the occurrence of the first audio event and second audio event. The electronic device 200 (e.g., processor 350) may determine that the HS value is 0 which corresponds to the index data having the highest priority. As a result, the electronic device 200 (e.g., processor 350) may transfer the HS value (HS=0) and index data determined from the second time t2 to the third time t3 to the vibration device IC 330 through the I2C bus 401 and transfer the A2H data and ACH data to the vibration device IC 330 through the I2S bus 402. The vibration device IC 330 may obtain data (e.g., PWM data) for generating vibration based on the index data corresponding to the HS value (HS=0) among the plurality of data during the period from the second time t2 to the third time t3 and drive the vibration device 310 based on the obtained data (e.g., PWM data) for generating vibration. Meanwhile, without limited thereto, the data for generating vibration may further include at least one of SDA or OWT data. In other words, an example in which the data for generating vibration is PWM data but, without limited to those described, the data may be appreciated as at least one of SDA or OWT data.

According to various embodiments, when generation of specific data among the plurality of data is terminated, the electronic device 200 may provide vibration based on the data selected depending on the priority of the remaining data generated. For example, A2H data and ACH data may be generated from the third time t3 when the generation of index data is terminated to fourth time t4. The electronic device 200 (e.g., processor 350) may set the HS value to 1 based on the ACH data having the higher priority among the A2H data and the ACH data, transfer the set HS value (HS=1) through the I2C bus 401 to the vibration device IC 330 from the third time t3 to fourth time t4, and transfer the A2H data and ACH data to the vibration device IC 330 through I2S. Accordingly, the vibration device IC 330 may stop the operation of generating vibration based on the index data from the third time t3, obtain the PWM data based on the ACH data corresponding to the HS value (HS=1) among the plurality of data from the third time t3 to the fourth time t4, and drive the vibration device 310 based on the obtained PWM data. As another example, only A2H data may be generated from the fourth time t4 when generation of the ACH data is terminated to the fifth time t5. The electronic device 200 (e.g., processor 350) may set the HS value to 2 based on the ACH data, transfer the set HS value (HS=2) to the vibration device IC 330 through the I2C bus 401 from the fourth time t4 to the fifth time t5, and transfer only A2H data to the vibration device IC 330 through I2S. Accordingly, the vibration device IC 330 may obtain PWM data based on the A2H data from the fourth time t4 to the fifth time t5 and drive the vibration device 310 based on the obtained PWM data. Meanwhile, as described above, the electronic device 200 (e.g., processor 350) may not transfer the HS value to the vibration device IC 330 during the time when one data (e.g., A2H data) is generated. The vibration device IC 330 may drive the vibration device 310 simply based on a single type of data received.

According to various embodiments, when generation of specific data is additionally generated, the electronic device 200 may provide vibration based on the data selected depending on the priorities of the plurality of data currently generated. For example, the electronic device 200 (e.g., processor 350) may set the HS value to 1 based on the ACH data having the higher priority among the A2H data and the ACH data based on additional generation of the ACH data from the fifth time t5. The electronic device 200 (e.g., processor 350) may drive the vibration device 310 based on the ACH data based on the HS value being set to 1. Accordingly, the electronic device 200 may stop the operation of generating vibration based on the A2H data from the fifth data t5 and perform the operation of generating vibration based on the ACH data. As another example, the electronic device 200 (e.g., processor 350) may set the HS value to 0 based on the index data having the highest priority, based on index data being additionally generated from the sixth time t6. The electronic device 200 (e.g., processor 350) may drive the vibration device 310 based on the index data based on the HS value being set to 0. Accordingly, the electronic device 200 may stop the operation of generating vibration based on the ACH data from the sixth data t6 and perform the operation of generating vibration based on the index data.

According to various embodiments, when no vibration event occurs and an audio event occurs (Yes in 1105), the vibration device IC 330 may obtain ACH data and/or A2H data, as data for generating vibration, based on the audio file in operation 1123, transfer the ACH data and/or A2H data through the second bus in operation 1125, and drive the vibration device 310 based on the ACH data and/or A2H data using the vibration circuit in operation 1127. For example, as described above in connection with FIGS. 3 to 6, the electronic device 200 (e.g., audio data acquisition module 500) may obtain the ACH data and/or A2H data from the file corresponding to the audio event based on the occurrence of the audio event. Further, the electronic device 200 (e.g., processor 350) may determine that the HS value is 1 and/or 2. As a result, the electronic device 200 (e.g., processor 350) may transfer the determined HS value (HS=1 and/or HS=2)) to the vibration device IC 330 through the I2C bus 401 and transfer the ACH data and/or A2H data to the vibration device IC 330 through the I2S bus 402. The vibration device IC 330 may obtain PWM data based on the ACH data and/or A2H data and drive the vibration device 310 based on the PWM data.

An example of an operation of an electronic device 200 is described below according to various embodiments.

According to various embodiments, the electronic device 200 (e.g., processor 350) may perform the operation of providing vibration while outputting audio based on the audio file obtained according to the type of audio event generated.

Figure 13:
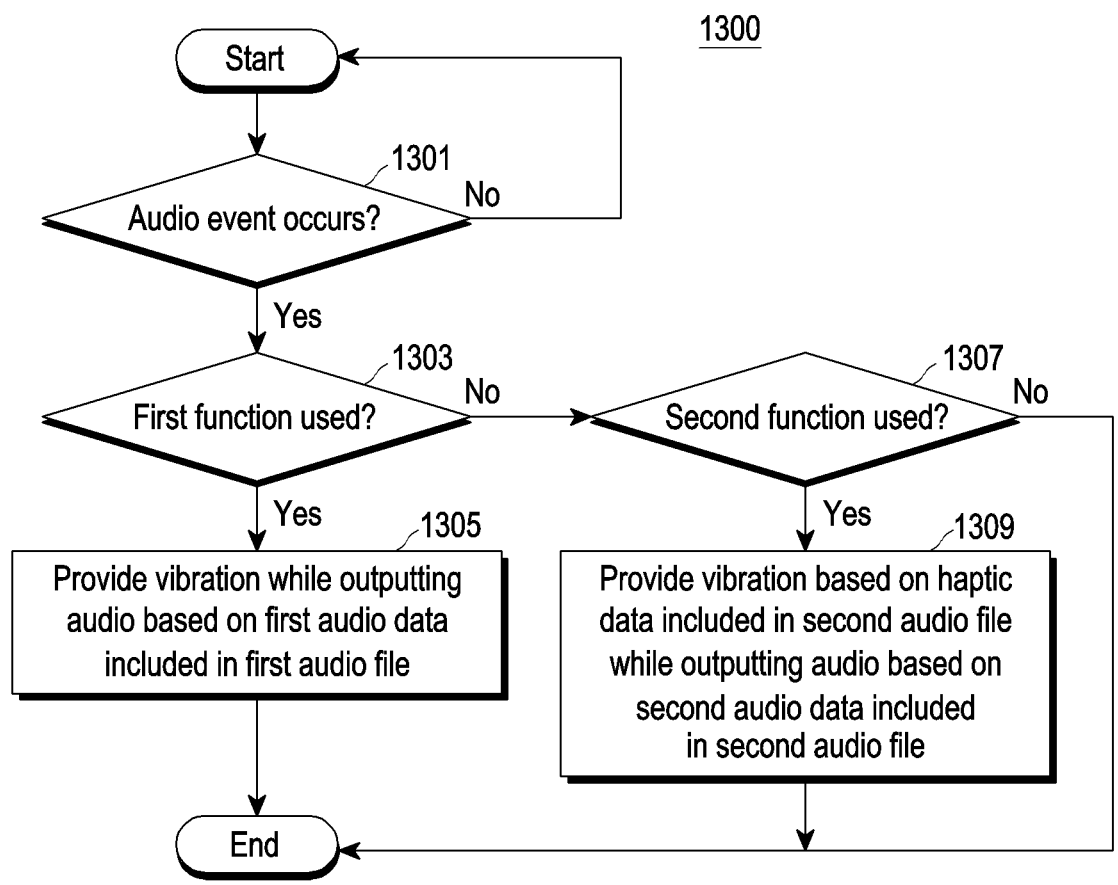
FIG. 13 is a flowchart illustrating an example of an operation of an electronic device according to various embodiments.

FIG. 13 is a flowchart 1300 illustrating an example of an operation of an electronic device 200 according to various embodiments. According to various embodiments, the operations shown in FIG. 13 are not limited to the shown order but may rather be performed in other various orders. According to various embodiments, more or less operations than those of FIG. 13 may be performed. FIG. 13 is described below with reference to FIG. 14.

Figure 14:
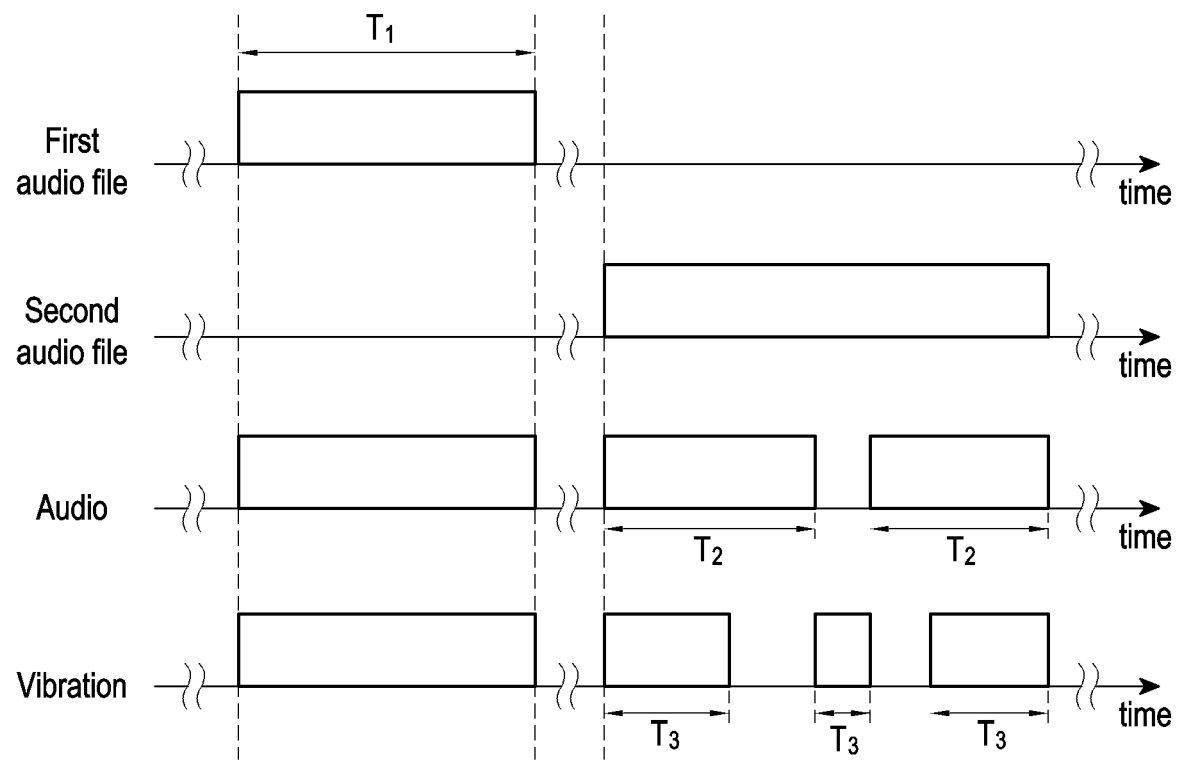
FIG. 14 is a view illustrating an example of an operation of providing audio and/or vibration of an electronic device according to an occurrence of an audio event according to various embodiments.

FIG. 14 is a view illustrating an example of an operation of providing audio and/or vibration of an electronic device 200 according to an occurrence of an audio event according to various embodiments.

According to various embodiments, the electronic device 200 may determine whether an audio event occurs in operation 1301. For example, the electronic device 200 may determine whether the audio event described in Table 2 occurs, based on the execution of an application.

According to various embodiments, when an audio event occurs (Yes in 1301), the electronic device 200 may determine whether a first function (e.g., A2H function) is used in operation 1303 and, when the first function (e.g., A2H function) is determined to be used (Yes in 1303), provide vibration while outputting audio based on the first audio data included in the first audio file in operation 1305. For example, upon identifying the A2H function corresponding to the generated audio event, the electronic device 200 may obtain audio data (e.g., PCM data) from the obtained audio file (e.g., wave file). Referring to FIG. 14, during a first time T1 of obtaining audio data (e.g., PCM data) from the audio file, the electronic device 200 may provide vibration using the vibration device 310 based on the audio data while outputting audio through the audio device 321 based on the audio data. The operation in which the electronic device 200 controls the vibration device 310 using the audio data (e.g., A2H data) has been described above, and thus, no detailed description thereof is given below.

According to various embodiments, when it is determined that the first function (e.g., A2H function) is not used (No in 1303), the electronic device 200 may determine whether to use the second function (e.g., ACH function) in operation 1307 and, when it is determined that the second function (e.g., ACH function) is used (Yes in 1307), provide vibration based on haptic data included in the second audio file while outputting audio based on the second audio data included in the second audio file in operation 1309. For example, upon identifying the ACH function corresponding to the generated audio event, the electronic device 200 may obtain audio data (e.g., ACH data) from the obtained audio file (e.g., OGG file). Referring to FIG. 14, during a second time T2 of obtaining audio data (e.g., PCM data) from the audio file, the electronic device 200 may output audio through the audio device 321 based on the audio data during the second time T2 of obtaining the audio data (e.g., PCM data) from the audio file and provide vibration using the vibration device 310 during the third time T3 of obtaining haptic data (e.g., PCM data) from the audio file. The operation in which the electronic device 200 controls the vibration device 310 using the audio data (e.g., ACH data) has been described above, and thus, no detailed description thereof is given below. As illustrated in FIG. 14, the second time T2 and the third time T3 may overlap each other at some times, but may not overlap each other. For example, in a case where the value of a specific time period corresponding to the audio data in the OGG file is 0 so that a sound is not provided in the specific time period, the value of the haptic data in the OGG file exists, so that vibration may be provided in the specific time period.

An example of an operation of an electronic device 200 is described below according to various embodiments.

According to various embodiments, without limited to the described example, the electronic device 200 (e.g., processor 350) may select data to be processed by the vibration device IC 330 from among the plurality of data (e.g., index data, A2H data, and ACH data) and transfer only the selected data to the vibration device IC 330, instead of performing the operation of transferring the HS value for selecting data for generating vibration to the vibration device IC 330. Accordingly, the vibration device IC 330 may drive the vibration device 310 using only the received data.

Figure 15:
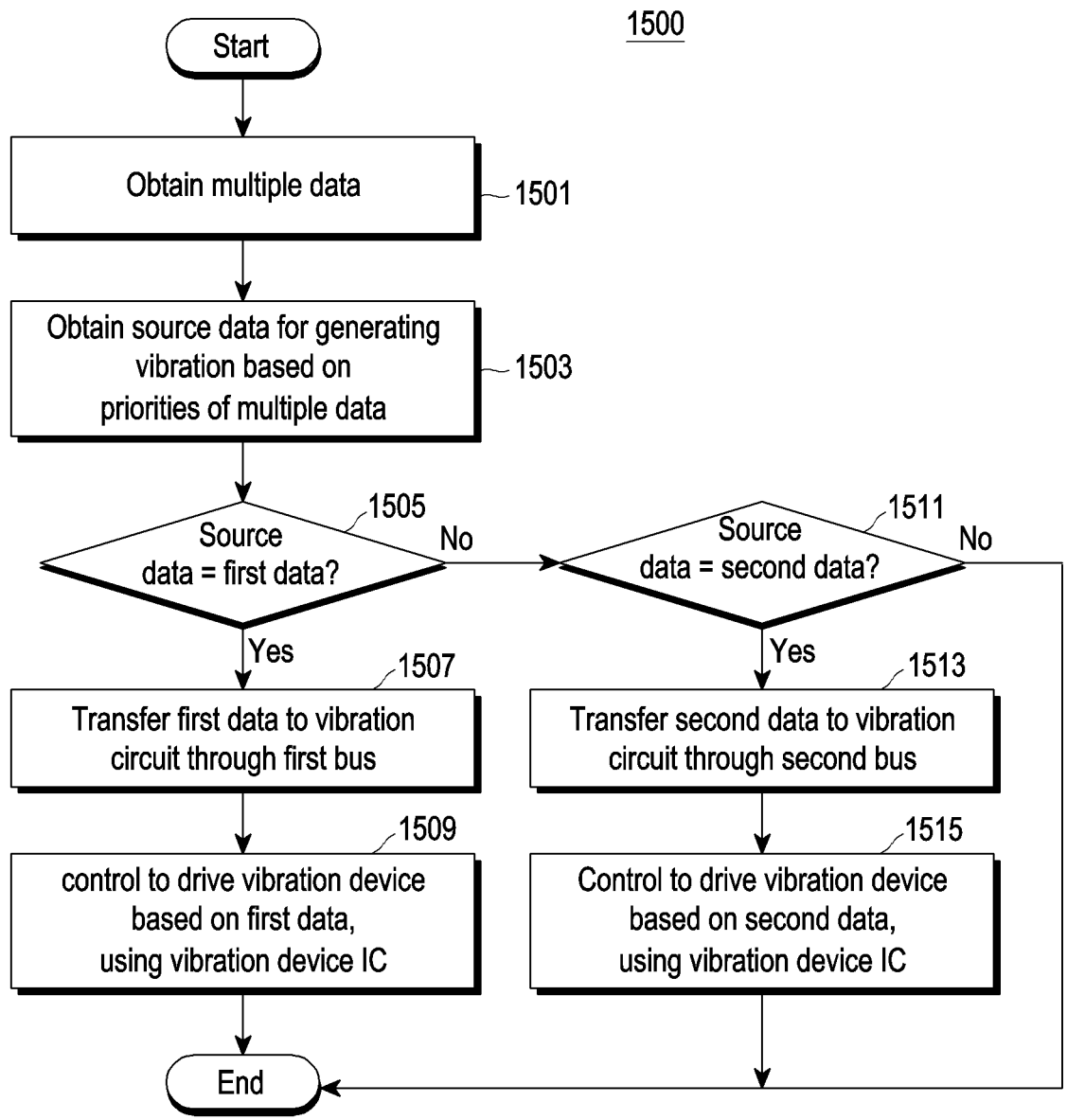
FIG. 15 is a flowchart illustrating an example of an operation of an electronic device according to various embodiments.

FIG. 15 is a flowchart 1500 illustrating an example of an operation of an electronic device 200 according to various embodiments. According to various embodiments, the operations shown in FIG. 15 are not limited to the shown order but may rather be performed in other various orders. According to various embodiments, more or less operations than those of FIG. 15 may be performed. FIG. 15 is described below with reference to FIG. 16.

Figure 16:
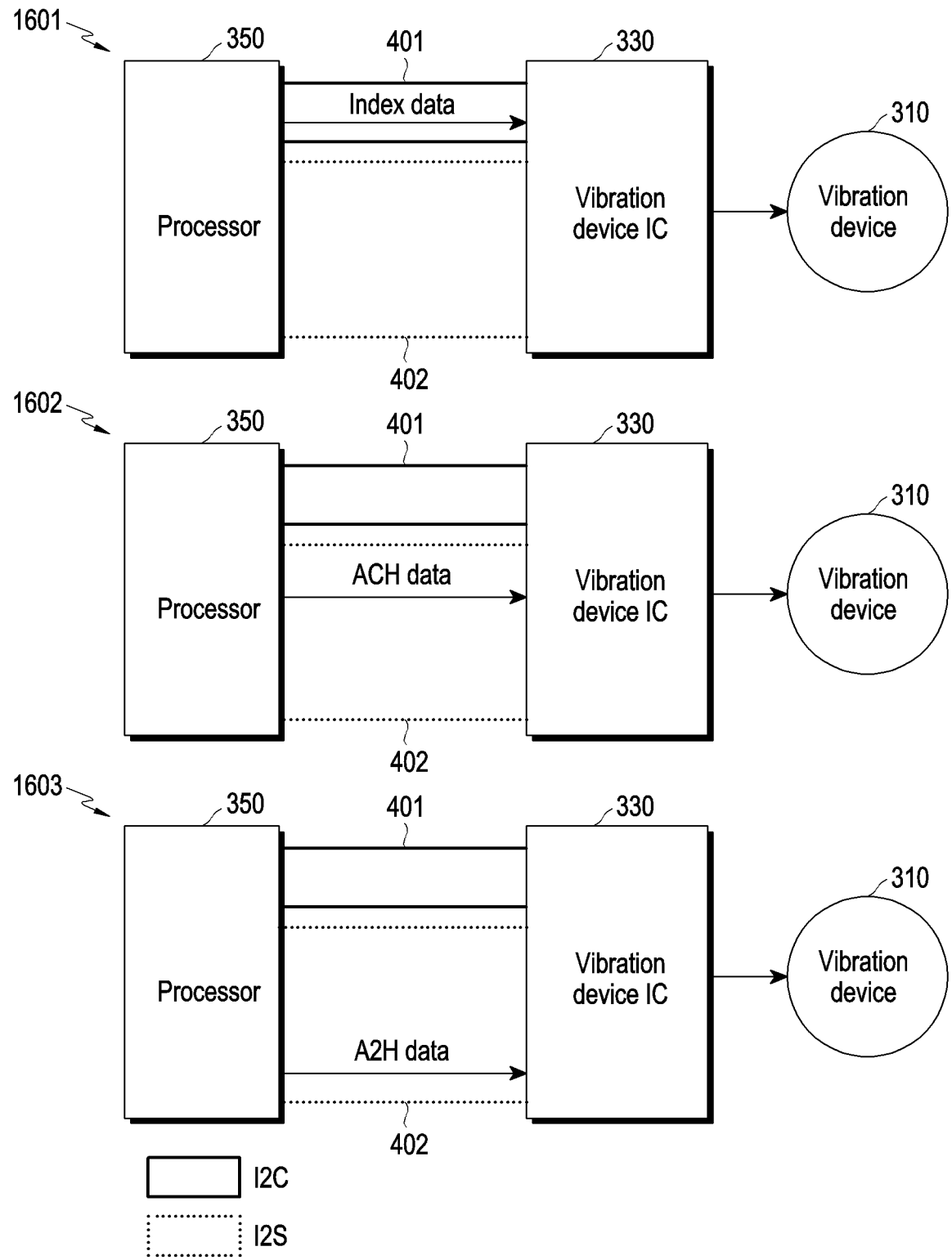
FIG. 16 is a view illustrating an example of an operation of transferring data selected from among a plurality of data of an electronic device to a vibration device IC according to various embodiments.

FIG. 16 is a view illustrating an example of an operation of transferring data selected from among a plurality of data (e.g., index data, ACH data, and A2H data) of an electronic device 200 to a vibration device IC 330 according to various embodiments.

According to various embodiments, in operation 1501, the electronic device 200 may obtain a plurality of data and, in operation 1503, select source data from among the plurality of data based on the priorities of the plurality of data. For example, the electronic device 200 (e.g., processor 350) may obtain the plurality of data (e.g., index data, A2H data, and ACH data) based on the occurrence of a vibration event and/or audio event. As described above, the electronic device 200 may select the data having the highest priority, as the data (e.g., source data) for generating vibration, from among the plurality of data (e.g., index data, A2H data, and ACH data) based on the priority of each of the plurality of data.

According to various embodiments, the electronic device 200 may determine whether the source data is the first data in operation 1505 and, when the source data is the first data (Yes in 1505), transfer the first data to the vibration device IC 330 through the first bus in operation 1507 and control to drive the vibration device 310 based on the first data using the vibration device IC 330, in operation 1509. According to various embodiments, when the source data is not the first data (No in 1505), the electronic device 200 may determine whether the second data is the second data in operation 1511 and, when the source data is the second data (Yes in 1511), transfer the second data to the vibration device IC 330 through the second bus in operation 1513 and control to drive the vibration device 310 based on the second data using the vibration device IC 330 in operation 1515. For example, as shown in 1601 of FIG. 16, the electronic device 200 (e.g., processor 350) may transfer the selected index data to the vibration device IC 330 through the I2C bus 401. As another example, as shown in 1602 of FIG. 16, the electronic device 200 (e.g., processor 350) may transfer the selected ACH data to the vibration device IC 330 through the I2S bus 402. As another example, as shown in 1603 of FIG. 16, the electronic device 200 (e.g., processor 350) may transfer the selected A2H data to the vibration device IC 330 through the I2S bus 402. The vibration device IC 330 may drive the vibration device 310 based on the received data (e.g., index data, ACH data, or A2H data) to allow the vibration device 310 to generate vibration.

According to various embodiments, there may be provided an electronic device (e.g., the electronic device 200 of FIG. 2) comprising a vibration device (e.g., the vibration device 310 of FIG. 3), a vibration device IC (e.g., the vibration device IC 330 of FIG. 3) connected to the vibration device (e.g., the vibration device 310 of FIG. 3), a first bus (e.g., the I2C bus 401 of FIG. 4A), a second bus (e.g., the I2S bus 402 of FIG. 4A), and at least one processor (e.g., the processor 350 of FIG. 3) electrically connected to the vibration device IC through each of the first bus (e.g., the I2C bus 401 of FIG. 4A) and the second bus (e.g., the I2S bus 402 of FIG. 4A), wherein the at least one processor (e.g., the processor 350 of FIG. 3) is configured to transfer first data to the vibration device IC (e.g., the vibration device IC 330 of FIG. 3) through the first bus (e.g., the I2C bus 401 of FIG. 4A), transfer second data to the vibration device IC (e.g., the vibration device IC 330 of FIG. 3) through the second bus (e.g., the I2S bus 402 of FIG. 4A) different from the first bus (e.g., the I2C bus 401 of FIG. 4A), and control the vibration device IC (e.g., the vibration device IC 330 of FIG. 3) to drive the vibration device (e.g., the vibration device 310 of FIG. 3) based on data selected from the first data and the second data.

According to various embodiments, there may be provided the electronic device (e.g., the electronic device 200 of FIG. 2), wherein the first bus (e.g., the I2C bus 401 of FIG. 4A) includes an inter integrated circuit (I2C) bus, and the second bus (e.g., the I2S bus 402 of FIG. 4A) includes an integrated interchip sound (I2S) bus.

According to various embodiments, there may be provided the electronic device (e.g., the electronic device 200 of FIG. 2), wherein the at least one processor (e.g., the processor 350 of FIG. 3) is further configured to obtain the first data indicating a characteristic of a vibration based on an occurrence of a first event for providing the vibration, wherein the characteristic of the vibration includes at least one of a magnitude of the vibration or a pattern of the vibration, and transfer the first data to the vibration device IC (e.g., the vibration device IC 330 of FIG. 3) through the first bus (e.g., the I2C bus 401 of FIG. 4A).

According to various embodiments, there may be provided the electronic device (e.g., the electronic device 200 of FIG. 2), wherein the at least one processor (e.g., the processor 350 of FIG. 3) is further configured to obtain an audio file based on an occurrence of a second event for outputting an audio, obtain the second data corresponding to a function for providing a vibration corresponding to the second event, based on the obtained audio file, wherein the second data includes pulse code modulation (PCM) data, and transfer the second data to the vibration device IC (e.g., the vibration device IC 330 of FIG. 3) through the second bus (e.g., the I2S bus 402 of FIG. 4A).

According to various embodiments, there may be provided the electronic device (e.g., the electronic device 200 of FIG. 2), wherein the function for providing the vibration includes an audio to haptics (A2H) function and an audio coupled haptics (ACH) function, and wherein the at least one processor (e.g., the processor 350 of FIG. 3) is further configured to, as at least part of obtaining the second data, obtain third data for providing the audio from the audio file when the function corresponding to the second event is the A2H function, and obtain fourth data for providing the vibration from the audio file when the function corresponding to the second event is the ACH function.

According to various embodiments, there may be provided the electronic device (e.g., the electronic device 200 of FIG. 2), further comprising an audio device; and an audio device IC for driving the audio device, wherein the at least one processor (e.g., the processor 350 of FIG. 3) is further configured to transfer the third data obtained from the audio file to the audio device IC while transferring the third data to the vibration device IC (e.g., the vibration device IC 330 of FIG. 3) through the second bus (e.g., the I2S bus 402 of FIG. 4A) when the function corresponding to the second event is the A2H function, and transfer fifth data for providing the audio obtained from the audio file to an audio device IC while transferring the fourth data to the vibration device IC (e.g., the vibration device IC 330 of FIG. 3) through the second bus (e.g., the I2S bus 402 of FIG. 4A) when the function corresponding to the second event is the ACH function.

According to various embodiments, there may be provided the electronic device (e.g., the electronic device 200 of FIG. 2), wherein the vibration device IC (e.g., the vibration device IC 330 of FIG. 3) provides the vibration based on the fourth data during a first time, wherein the audio device outputs an audio based on the fifth data during a second time, and at least a portion of the first time differs from the second time.

According to various embodiments, there may be provided the electronic device (e.g., the electronic device 200 of FIG. 2), wherein the at least one processor (e.g., the processor 350 of FIG. 3) is further configured to transfer a value for selecting the data from the first data and the second data to the vibration device IC (e.g., the vibration device IC 330 of FIG. 3).

According to various embodiments, there may be provided the electronic device (e.g., the electronic device 200 of FIG. 2), wherein the at least one processor (e.g., the processor 350 of FIG. 3) is further configured to determine the value for selecting the data based on first information about a priority of the first data and a priority of the second data, and wherein the determined value indicates data having a higher priority of the priority of the first data and the priority of the second data.

According to various embodiments, there may be provided the electronic device (e.g., the electronic device 200 of FIG. 2), further comprising a memory, wherein the memory stores the first information indicating that a priority of data corresponding to a first event for providing the vibration is higher than a priority of data corresponding to a second event for outputting the audio.

According to various embodiments, there may be provided the electronic device (e.g., the electronic device 200 of FIG. 2), wherein the at least one processor (e.g., the processor 350 of FIG. 3) is further configured to, when the priority of the first data is higher than the priority of the second data, transfer a first value indicating the first data to the vibration device IC (e.g., the vibration device IC 330 of FIG. 3) during a first time when the first data and the second data are obtained, and transfer a second value indicating the second data to the vibration device IC (e.g., the vibration device IC 330 of FIG. 3) during a second time when the second data is obtained after obtaining the first data is terminated.

According to various embodiments, there may be provided the electronic device (e.g., the electronic device 200 of FIG. 2), wherein the at least one processor (e.g., the processor 350 of FIG. 3) is further configured to determine the value based on an occurrence of a second event for outputting an audio, and transfer the determined value to the vibration device IC (e.g., the vibration device IC 330 of FIG. 3) through the first bus (e.g., the I2C bus 401 of FIG. 4A).

According to various embodiments, there may be provided a method for operating an electronic device (e.g., the electronic device 200 of FIG. 2), comprising transferring first data to a vibration device IC (e.g., the vibration device IC 330 of FIG. 3) of the electronic device (e.g., the electronic device 200 of FIG. 2) through a first bus (e.g., the I2C bus 401 of FIG. 4A) of the electronic device (e.g., the electronic device 200 of FIG. 2), transferring second data to the vibration device IC (e.g., the vibration device IC 330 of FIG. 3) through a second bus (e.g., the I2S bus 402 of FIG. 4A) of the electronic device (e.g., the electronic device 200 of FIG. 2), different from the first bus (e.g., the I2C bus 401 of FIG. 4A), and controlling the vibration device IC (e.g., the vibration device IC 330 of FIG. 3) to drive the vibration device (e.g., the vibration device 310 of FIG. 3) based on data selected from the first data and the second data.

According to various embodiments, there may be provided the method, wherein the first bus (e.g., the I2C bus 401 of FIG. 4A) includes an inter integrated circuit (I2C) bus, and the second bus (e.g., the I2S bus 402 of FIG. 4A) includes an integrated interchip sound (I2S) bus.

According to various embodiments, there may be provided the method, further comprising obtaining the first data indicating a characteristic of a vibration based on an occurrence of a first event for providing the vibration, wherein the characteristic of the vibration includes at least one of a magnitude of the vibration or a pattern of the vibration, and transferring the first data to the vibration device IC (e.g., the vibration device IC 330 of FIG. 3) through the first bus (e.g., the I2C bus 401 of FIG. 4A).

According to various embodiments, there may be provided the method, further comprising obtaining an audio file based on an occurrence of a second event for outputting an audio, obtaining the second data corresponding to a function for providing a vibration corresponding to the second event, based on the obtained audio file, wherein the second data includes pulse code modulation (PCM) data, and transferring the second data to the vibration device IC (e.g., the vibration device IC 330 of FIG. 3) through the second bus (e.g., the I2S bus 402 of FIG. 4A).

According to various embodiments, there may be provided the method, wherein the function for providing the vibration includes an audio to haptics (A2H) function and an audio coupled haptics (ACH) function, and wherein the obtaining the second data includes obtaining third data for providing the audio from the audio file when the function corresponding to the second event is the A2H function, and obtaining fourth data for providing the vibration from the audio file when the function corresponding to the second event is the ACH function.

According to various embodiments, there may be provided the method, further comprising transferring the third data obtained from the audio file to an audio device IC of the electronic device (e.g., the electronic device 200 of FIG. 2) while transferring the third data to the vibration device IC (e.g., the vibration device IC 330 of FIG. 3) through the second bus (e.g., the I2S bus 402 of FIG. 4A) when the function corresponding to the second event is the A2H function, and transferring fifth data for providing the audio obtained from the audio file to the audio device IC while transferring the fourth data to the vibration device IC (e.g., the vibration device IC 330 of FIG. 3) through the second bus (e.g., the I2S bus 402 of FIG. 4A) when the function corresponding to the second event is the ACH function.

According to various embodiments, there may be provided the method, further comprising providing the vibration based on the fourth data during a first time, by the vibration device IC (e.g., the vibration device IC 330 of FIG. 3) and outputting an audio based on the fifth data during a second time, by the audio device IC, wherein at least a portion of the first time differs from the second time.

According to various embodiments, there may be provided an electronic device (e.g., the electronic device 200 of FIG. 2) comprising a vibration device (e.g., the vibration device 310 of FIG. 3), a vibration device IC (e.g., the vibration device IC 330 of FIG. 3) connected to the vibration device (e.g., the vibration device 310 of FIG. 3), an I2C bus, an I2S bus, and at least one processor (e.g., the processor 350 of FIG. 3) electrically connected to the vibration device IC through each of the I2C bus and the I2S bus, wherein the at least one processor (e.g., the processor 350 of FIG. 3) is configured to transfer first data to the vibration device IC through the I2C bus, and transfer second data to the vibration device IC through the I2S bus, wherein the second data includes PCM data.

What is claimed is:

1. An electronic device comprising:
a vibration device;
a vibration device integrated circuit (IC) including a first output terminal connected to the vibration device and a second output terminal different from the first output terminal connected to the vibration device;
a first bus;
a second bus different from the first bus; and
at least one processor electrically connected to the vibration device IC through each of the first bus and the second bus, wherein the at least one processor is configured to:
transfer first data to the vibration device IC through the first bus; and
transfer second data to the vibration device IC through the second bus, and
wherein the vibration device IC is configured to drive the vibration device based on data which is outputted from the first output terminal and is based on the first data, or data which is outputted from the second output terminal and is based on the second data.

2. The electronic device of claim 1,
wherein the first bus includes an inter integrated circuit (I2C) bus, the first bus establishing electrical connection between the at least one processor of the electronic device and the first output terminal; and
wherein the second bus includes an integrated interchip sound (I2S) bus, the second bus establishing electrical connection between the at least one processor and the second output terminal.

3. The electronic device of claim 2, wherein the at least one processor is further configured to:
obtain the first data indicating a characteristic of a vibration based on an occurrence of a first event for providing the vibration, wherein the characteristic of the vibration includes at least one of a magnitude of the vibration or a pattern of the vibration, and
transfer the first data to the vibration device IC through the first bus.

4. The electronic device of claim 2, wherein the at least one processor is further configured to:
obtain an audio file based on an occurrence of a second event for outputting an audio,
obtain the second data corresponding to a function for providing a vibration corresponding to the second event, based on the obtained audio file, wherein the second data includes pulse code modulation (PCM) data, and
transfer the second data to the vibration device IC through the second bus.

5. The electronic device of claim 4,
wherein the function for providing the vibration includes an audio to haptics (A2H) function and an audio coupled haptics (ACH) function, and
wherein the at least one processor is further configured to, as at least part of obtaining the second data:

obtain third data for providing the audio from the audio file when the function corresponding to the second event is the A2H function, and
obtain fourth data for providing the vibration from the audio file when the function corresponding to the second event is the ACH function.

6. The electronic device of claim 5, further comprising,
an audio device; and
an audio device IC for driving the audio device,
wherein the at least one processor is further configured to:
transfer the third data obtained from the audio file to the audio device IC while transferring the third data to the vibration device IC through the second bus when the function corresponding to the second event is the A2H function, and
transfer fifth data for providing the audio obtained from the audio file to an audio device IC while transferring the fourth data to the vibration device IC through the second bus when the function corresponding to the second event is the ACH function.

7. The electronic device of claim 6,
wherein the vibration device IC provides the vibration based on the fourth data during a first time,
wherein the audio device outputs an audio based on the fifth data during a second time, and
wherein at least a portion of the first time differs from the second time.

8. The electronic device of claim 2, wherein the at least one processor is further configured to:
transfer a value for selecting the data from the first data and the second data to the vibration device IC.

9. The electronic device of claim 8, wherein the at least one processor is further configured to:
determine the value for selecting the data based on first information about a priority of the first data and a priority of the second data, wherein the determined value indicates data having a higher priority of the priority of the first data and the priority of the second data.

10. The electronic device of claim 9, further comprising,
a memory;
wherein the memory stores the first information indicating that a priority of data corresponding to a first event for providing the vibration is higher than a priority of data corresponding to a second event for outputting the audio.

11. The electronic device of claim 9, wherein the at least one processor is further configured to, when the priority of the first data is higher than the priority of the second data:
transfer a first value indicating the first data to the vibration device IC during a first time when the first data and the second data are obtained, and
transfer a second value indicating the second data to the vibration device IC during a second time when the second data is obtained after obtaining the first data is terminated.

12. The electronic device of claim 8, wherein the at least one processor is further configured to:
determine the value based on an occurrence of a second event for outputting an audio, and
transfer the determined value to the vibration device IC through the first bus.

13. A method for operating an electronic device, the method comprising:
transferring first data to a vibration device integrated circuit (IC) of the electronic device through a first bus of the electronic device, the vibration device IC including a first output terminal connected to a vibration device and a second output terminal different from the first output terminal connected to the vibration device;

transferring second data to the vibration device IC through a second bus of the electronic device different from the first bus; and controlling the vibration device IC to drive the vibration device based on data which is outputted from the first output terminal of the vibration device IC and is based on the first data, or data which is outputted from the second output terminal of the vibration device IC and is based on the second data.

14. The method of claim 13, wherein the first bus includes an inter integrated circuit (I2C) bus, the first bus establishing electrical connection between at least one processor of the electronic device and the first output terminal; and wherein the second bus includes an integrated interchip sound (I2S) bus, the second bus establishing electrical connection between the at least one processor and the second output terminal.

15. The method of claim 14, further comprising:

obtaining the first data indicating a characteristic of a vibration based on an occurrence of a first event for providing the vibration, wherein the characteristic of the vibration includes at least one of a magnitude of the vibration or a pattern of the vibration; and transferring the first data to the vibration device IC through the first bus.

16. The method of claim 14, further comprising:

obtaining an audio file based on an occurrence of a second event for outputting an audio;

obtaining the second data corresponding to a function for providing a vibration corresponding to the second event, based on the obtained audio file, wherein the second data includes pulse code modulation (PCM) data; and transferring the second data to the vibration device IC through the second bus.

17. The method of claim 16, wherein the function for providing the vibration includes an audio to haptics (A2H) function and an audio coupled haptics (ACH) function, and wherein the obtaining the second data includes:

obtaining third data for providing the audio from the audio file when the function corresponding to the second event is the A2H function; and obtaining fourth data for providing the vibration from the audio file when the function corresponding to the second event is the ACH function.

18. The method of claim 17, further comprising:

transferring the third data obtained from the audio file to an audio device IC of the electronic device while transferring the third data to the vibration device IC through the second bus when the function corresponding to the second event is the A2H function; and transferring fifth data for providing the audio obtained from the audio file to the audio device IC while transferring the fourth data to the vibration device IC through the second bus when the function corresponding to the second event is the ACH function.

19. The method of claim 18, further comprising:

providing the vibration based on the fourth data during a first time, by the vibration device IC; and outputting an audio based on the fifth data during a second time, by the audio device IC;

wherein at least a portion of the first time differs from the second time.

20. An electronic device, comprising:

a vibration device;

a vibration device IC including a first output terminal connected to the vibration device and a second output terminal different from the first output terminal connected to the vibration device;

an inter integrated circuit (I2C) bus;

an integrated interchip sound (I2S) bus; and at least one processor electrically connected to the vibration device IC through each of the I2C bus and the I2S bus, wherein the at least one processor is configured to:

transfer first data to the vibration device IC through the I2C bus; and transfer second data to the vibration device IC through the I2S bus, wherein the second data includes pulse code modulation (PCM) data, and wherein the vibration device IC is configured to drive the vibration device based on data which is outputted from the first output terminal and is based on the first data, or data which is outputted from the second output terminal and is based on the second data.

* * * * *